(12) United States Patent
Santini et al.

(10) Patent No.: US 9,950,780 B2
(45) Date of Patent: Apr. 24, 2018

(54) HORIZONTAL FOLDING WINGTIP

(71) Applicant: The Boeing Company, Chicago, IL (US)

(72) Inventors: Gregory M. Santini, Bothell, WA (US); Seiya Sakurai, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 264 days.

(21) Appl. No.: 14/961,895

(22) Filed: Dec. 8, 2015

(65) Prior Publication Data

US 2016/0083074 A1 Mar. 24, 2016

Related U.S. Application Data

(60) Division of application No. 13/964,072, filed on Aug. 10, 2013, now Pat. No. 9,296,469, and a continuation-in-part of application No. 13/664,416, filed on Oct. 30, 2012, and a continuation-in-part of application No. 13/251,216, filed on Oct. 1, 2011.

(60) Provisional application No. 61/720,351, filed on Oct. 30, 2012.

(51) Int. Cl.
*B64C 3/56* (2006.01)
*B64C 5/14* (2006.01)

(52) U.S. Cl.
CPC ............... *B64C 3/56* (2013.01); *B64C 5/14* (2013.01); *Y02T 50/145* (2013.01)

(58) Field of Classification Search
CPC .... B64C 3/56; B64C 5/08; B64C 5/12; B64C 23/065

USPC ... 244/49, 218, 39, 199.4, 124, 123.1, 123.8
See application file for complete search history.

(56) References Cited

U.S. PATENT DOCUMENTS

| | | | |
|---|---|---|---|
| 1,718,617 A | 6/1929 | Wagner | |
| 1,723,962 A | 8/1929 | Weymouth | |
| 2,021,324 A | 11/1935 | Osborn | |
| 2,166,564 A | 7/1939 | Atwood et al. | |
| 2,280,809 A | 4/1942 | Evans | |
| 2,289,224 A | 7/1942 | Swanson et al. | |
| 2,290,850 A | 7/1942 | Umschweif | |
| 2,375,423 A | 5/1945 | Odilon | |
| 2,392,506 A | 1/1946 | Rosmann | |

(Continued)

FOREIGN PATENT DOCUMENTS

| | | | |
|---|---|---|---|
| EP | 1375342 A1 | 1/2004 | |
| EP | 0988225 B1 | 10/2006 | |

(Continued)

OTHER PUBLICATIONS

European Patent Office Examination Report, dated May 15, 2017, regarding Application No. EP13189962.7, 4 pages.

(Continued)

*Primary Examiner* — Marc R Burgess
(74) *Attorney, Agent, or Firm* — Yee & Associates, P.C.

(57) ABSTRACT

An apparatus of an aircraft, the apparatus may include a wing comprising an unfixed portion and a fixed portion. The unfixed portion movably may connect to the fixed portion. The unfixed portion may include a rotating portion to rotate the unfixed portion between a flight position and a folded position. The fixed portion may connect to the unfixed portion of the wing. A joint may allow rotation of the unfixed portion of the wing with respect to the fixed portion of the wing about a rotation axis.

18 Claims, 15 Drawing Sheets

(56) References Cited

U.S. PATENT DOCUMENTS

| | | | |
|---|---|---|---|
| 2,444,332 A | | 6/1948 | Briggs et al. |
| 2,468,425 A | | 4/1949 | Carpenter et al. |
| 2,533,429 A | | 12/1950 | Carpenter |
| 2,674,422 A | | 4/1954 | Pellarini |
| 2,712,421 A | | 7/1955 | Naumann |
| 2,719,682 A | | 10/1955 | Handel |
| 2,876,677 A | | 3/1959 | Clark et al. |
| 3,081,053 A | | 3/1963 | Jarrell |
| 3,556,439 A | | 1/1971 | Autry et al. |
| 4,022,403 A | * | 5/1977 | Chiquet ............... B61B 15/00 244/46 |
| 4,249,765 A | | 2/1981 | Janssen |
| 4,336,914 A | | 6/1982 | Thomson |
| 4,457,479 A | | 7/1984 | Daude |
| 4,824,053 A | | 4/1989 | Sarh |
| 4,858,857 A | | 8/1989 | Lange et al. |
| 5,192,037 A | | 3/1993 | Moorefield |
| 5,201,479 A | | 4/1993 | Renzelmann |
| 5,310,138 A | | 5/1994 | Fitzgibbon |
| 5,350,135 A | | 9/1994 | Renzelmann et al. |
| 5,372,336 A | | 12/1994 | Peaz |
| 5,379,969 A | | 1/1995 | Marx et al. |
| 5,381,986 A | | 1/1995 | Smith et al. |
| 5,427,329 A | | 6/1995 | Renzelmann et al. |
| 5,452,643 A | | 9/1995 | Smith et al. |
| 5,492,288 A | | 2/1996 | Bordelon |
| 5,495,999 A | | 3/1996 | Cymara |
| 5,558,299 A | | 9/1996 | Veile |
| 5,593,113 A | | 1/1997 | Cox |
| 5,671,899 A | | 9/1997 | Nicholas et al. |
| 5,743,490 A | | 4/1998 | Gillingham et al. |
| 5,988,563 A | | 11/1999 | Allen |
| 6,032,418 A | | 3/2000 | Larson |
| 6,076,766 A | | 6/2000 | Gruensfelder |
| 6,089,502 A | | 7/2000 | Herrick et al. |
| 6,168,113 B1 | | 1/2001 | Hann et al. |
| 6,260,799 B1 | | 7/2001 | Russ |
| 6,273,369 B1 | | 8/2001 | Nishimura |
| 6,446,906 B1 | | 9/2002 | Voigt et al. |
| 6,834,835 B1 | | 12/2004 | Knowles et al. |
| 7,153,100 B2 | * | 12/2006 | Frampton ............ F04D 25/088 416/140 |
| 7,275,722 B2 | | 10/2007 | Irving et al. |
| 7,445,180 B2 | | 11/2008 | Plude et al. |
| 7,637,454 B2 | | 12/2009 | Pitt |
| 7,744,038 B2 | | 6/2010 | Sankrithi et al. |
| 8,089,034 B2 | | 1/2012 | Hammerquist |
| 8,157,206 B2 | | 4/2012 | Gionta et al. |
| 8,336,830 B2 | | 12/2012 | Eberhardt |
| 8,342,447 B2 | | 1/2013 | Etling |
| 8,733,692 B2 | | 5/2014 | Kordel et al. |
| 8,777,153 B2 | * | 7/2014 | Parker .................... B64C 3/56 244/49 |
| 2002/0066825 A1 | | 6/2002 | Miralles |
| 2007/0057120 A1 | | 3/2007 | McConnell |
| 2009/0045288 A1 | | 2/2009 | Nakamura et al. |
| 2009/0302151 A1 | | 12/2009 | Holmes |
| 2010/0084516 A1 | | 4/2010 | Eberhardt |
| 2011/0001016 A1 | | 1/2011 | Skillen et al. |
| 2011/0180657 A1 | | 7/2011 | Gionta et al. |
| 2012/0032023 A1 | | 2/2012 | Bousfield et al. |
| 2012/0085858 A1 | | 4/2012 | Seifert |
| 2012/0228424 A1 | | 9/2012 | Parker |
| 2013/0099060 A1 | | 4/2013 | Dees et al. |
| 2013/0146716 A1 | | 6/2013 | Gettinger |
| 2013/0292508 A1 | | 11/2013 | Fox |
| 2013/0313356 A1 | | 11/2013 | Santini et al. |
| 2013/0327883 A1 | | 12/2013 | Kordel et al. |
| 2014/0014768 A1 | | 1/2014 | Lassen et al. |
| 2014/0061371 A1 | | 3/2014 | Good et al. |
| 2014/0117150 A1 | | 5/2014 | Good et al. |
| 2014/0117151 A1 | | 5/2014 | Fox et al. |
| 2015/0014478 A1 | | 1/2015 | Lassen et al. |
| 2015/0097087 A1 | * | 4/2015 | Sakurai .................... B64C 9/00 244/201 |

FOREIGN PATENT DOCUMENTS

| | | |
|---|---|---|
| EP | 2650212 A1 | 10/2013 |
| GB | 481050 A | 3/1938 |
| GB | 651436 A | 4/1951 |
| GB | 773739 A | 5/1957 |
| WO | WO2011051699 A2 | 5/2011 |

OTHER PUBLICATIONS

Notice of Allowance, dated Apr. 7, 2016, regarding U.S. Appl. No. 13/962,952, 12 pages.

Final Office Action, dated Feb. 10, 2016, regarding U.S. Appl. No. 13/966,754, 35 pages.

Office Action, dated Feb. 8, 2016, regarding U.S. Appl. No. 14/335,625, 38 pages.

Notice of Allowance, dated Jun. 8, 2016, regarding U.S. Appl. No. 13/966,754, 19 pages.

Notice of Allowance, dated Jul. 19, 2016, regarding U.S. Appl. No. 14/335,625, 20 pages.

Office Action, dated Dec. 31, 2015, regarding U.S. Appl. No. 13/962,952, 30 pages.

Extended European Search Report, dated Jul. 21, 2015, regarding Application No. EP13190093.8, 6 pages.

Extended European Search Report, dated Jul. 24, 2015, regarding Application No. EP13189910.6, 6 pages.

Extended European Search Report, dated Jul. 24, 2015, regarding Application No. EP13190099.5, 5 pages.

Extended European Search Report, dated Jul. 27, 2015, regarding Application No. EP13189962.7, 7 pages.

Canadian Intellectual Property Office Examination Search Report, dated Aug. 3, 2015, regarding Application No. 2,825,073, 4 pages.

Canadian Intellectual Property Office Examination Search Report, dated Aug. 13, 2015, regarding Application No. 2,824,727, 4 pages.

"Folding wing," Wikipedia Foundation, Inc., dated Jun. 2, 2013, 5 pages.Accessed Jul. 29, 2013, http://en.wikipedia.org/wiki/Folding_wing.

Young et al., "Aircraft Excrescence Drag," North Atlantic Treaty Organization Advisory Group for Aerospace Research and Development AGARD-AG-264, Jul. 1981, 172 pages.

Office Action, dated Mar. 24, 2015, regarding U.S. Appl. No. 13/962,952, 24 pages.

Office Action, dated Jul. 20, 2015, regarding U.S. Appl. No. 14/022,622, 23 pages.

Notice of Allowance, dated Aug. 6, 2015, regarding U.S. Appl. No. 14/049,425, 20 pages.

Notice of Allowance, dated Jul. 24, 2015, regarding U.S. Appl. No. 13/964,072, 17 pages.

Office Action, dated Sep. 23, 2015, regarding U.S. Appl. No. 13/966,754, 16 pages.

Dong, "Adaptive Wing for an Aircraft," U.S. Appl. No. 13/871,296, filed Apr. 26, 2013, 27 pages.

Fox et al., "Wing Fold System Rotating Latch," U.S. Appl. No. 13/966,754, filed Aug. 14, 2013, 90 pages.

Final Office Action, dated Aug. 21, 2015, regarding U.S. Appl. No. 13/962,952, 12 pages.

Notice of Allowance, dated Nov. 12, 2015, regarding U.S. Appl. No. 14/022,622, 15 pages.

Canadian Intellectual Property Office Examination Search Report, dated Nov. 30, 2016, regarding Application No. 2,828,726, 5 pages.

Canadian Intellectual Property Office Examination Search Report, dated Sep. 27, 2017, regarding Application No. 2,828,726, 4 pages.

European Patent Office Examination Search Report, dated Nov. 30, 2017, regarding Application No. 13189783.7, 10 pages.

* cited by examiner

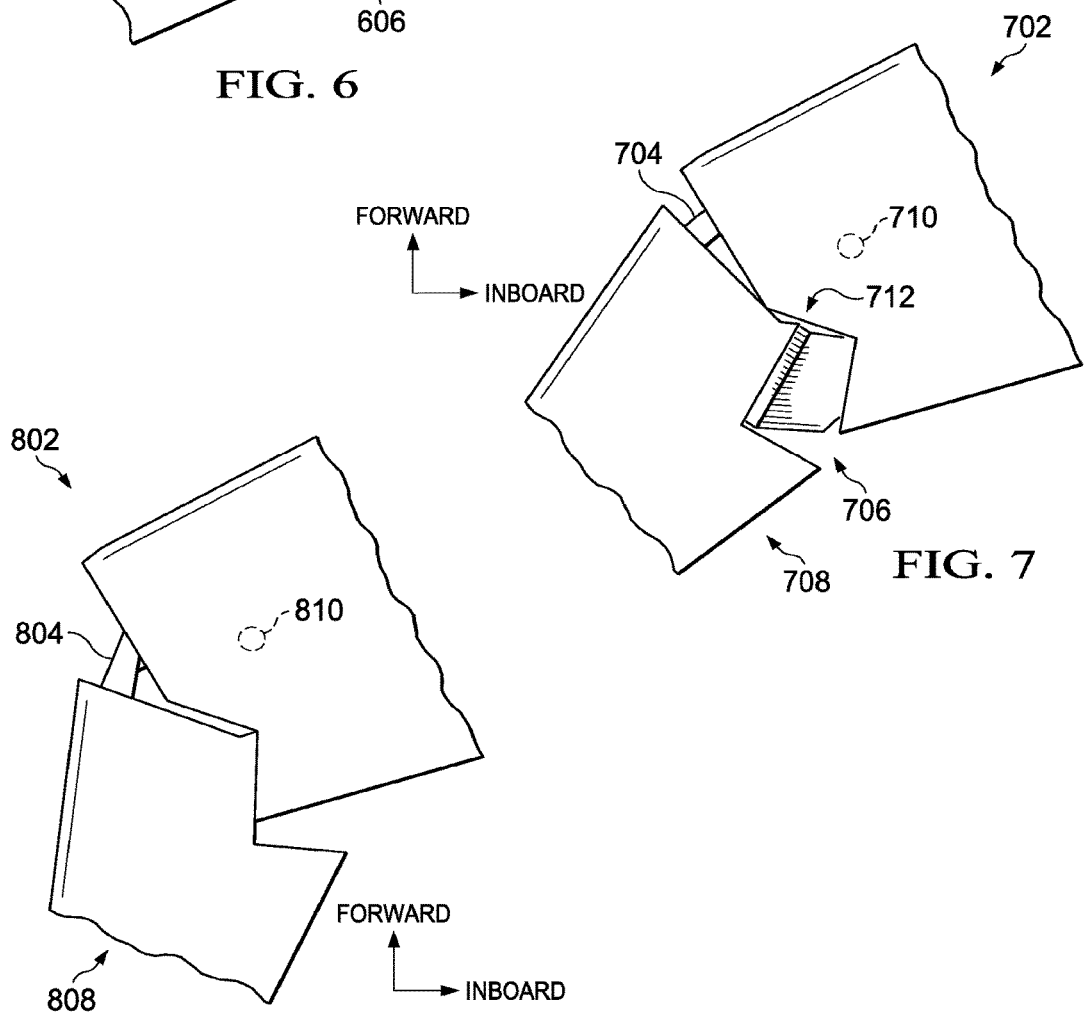

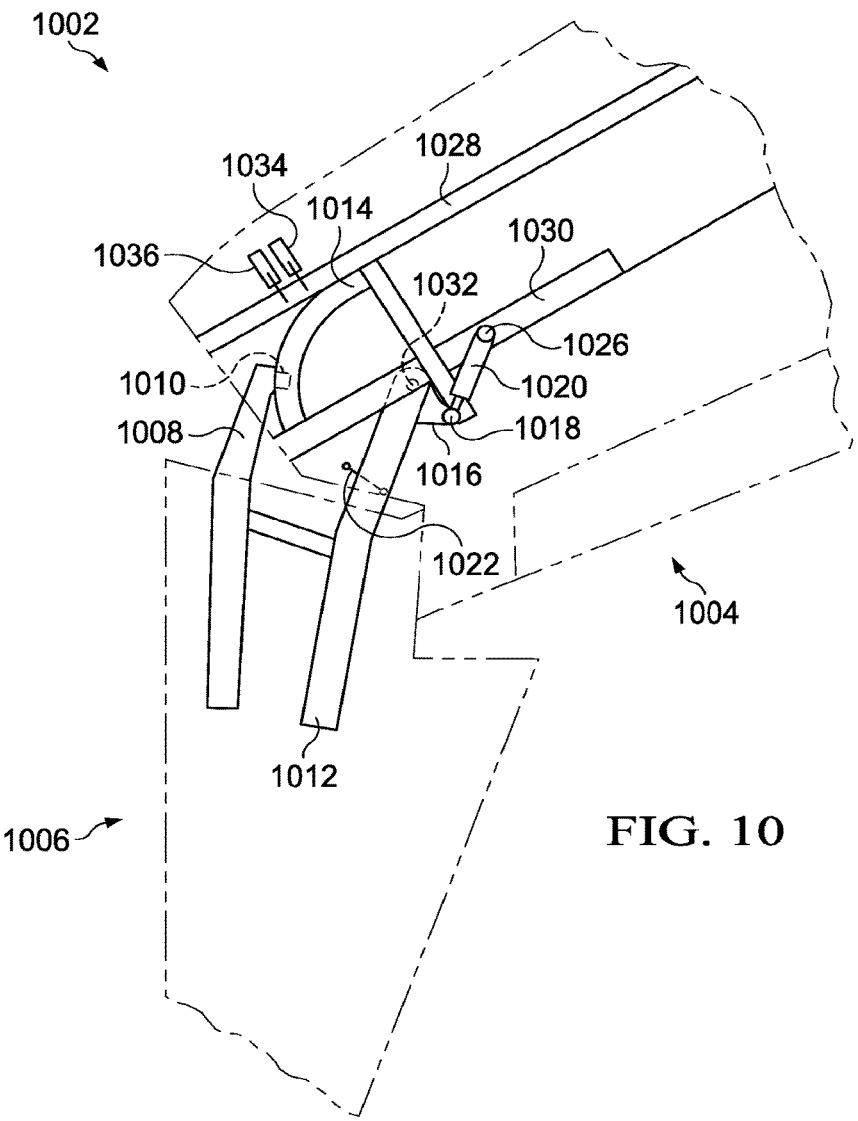
FIG. 10
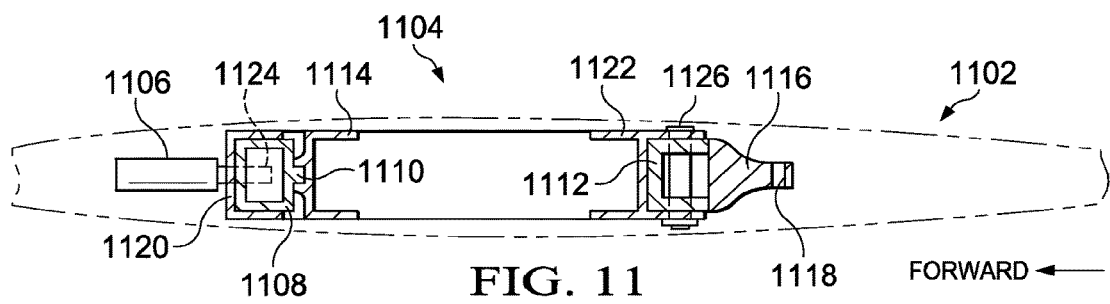
FIG. 11  FORWARD ←

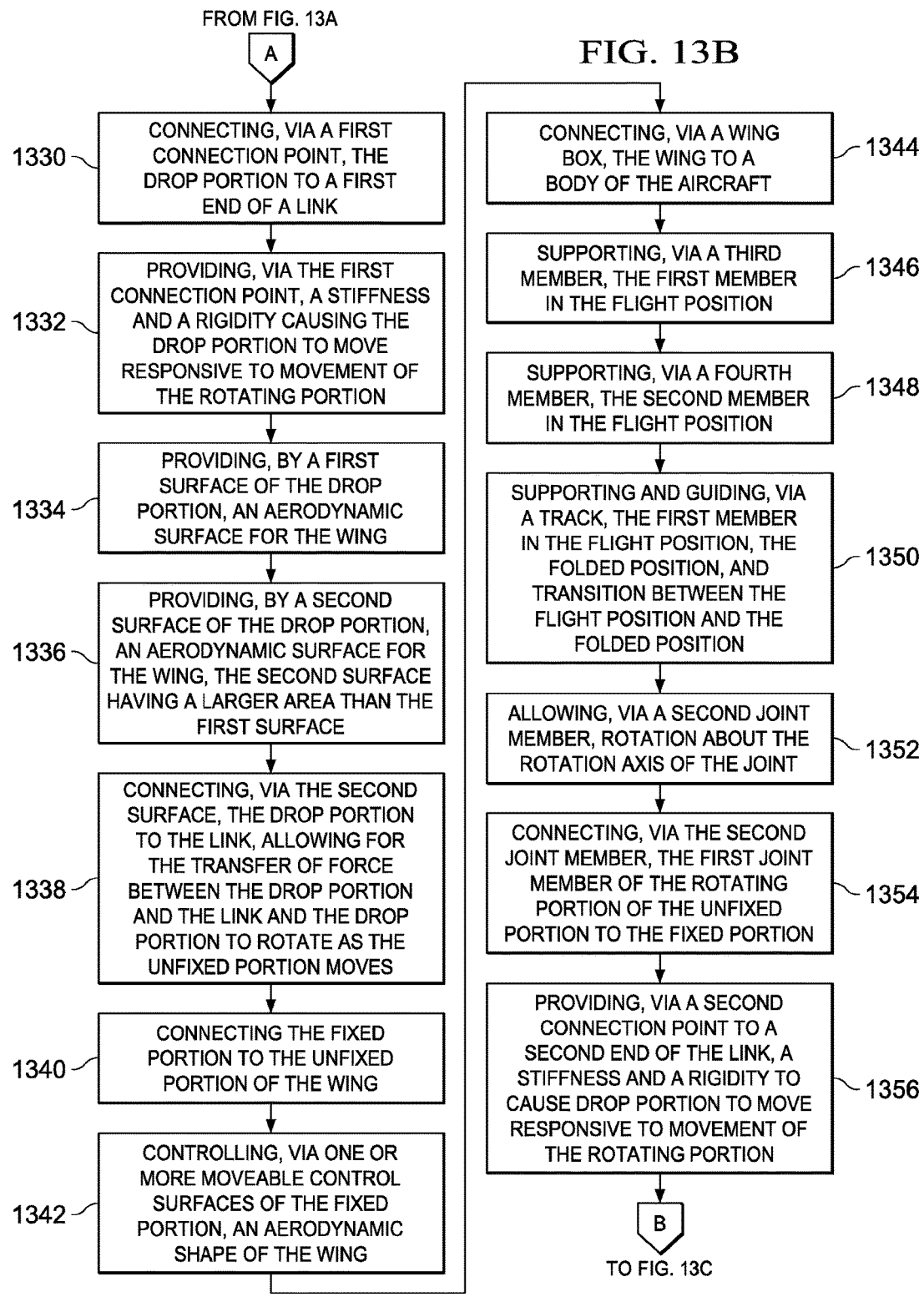

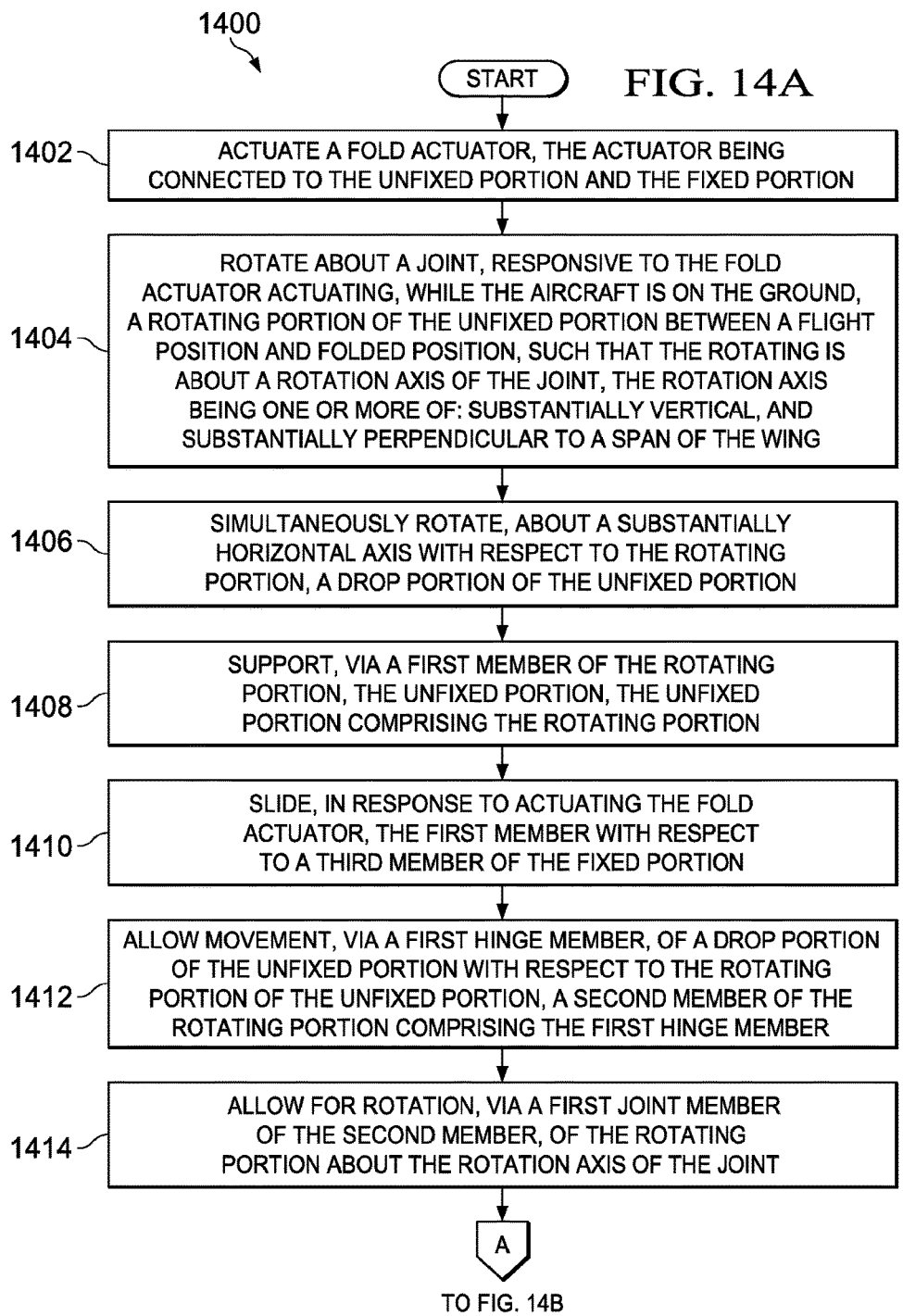

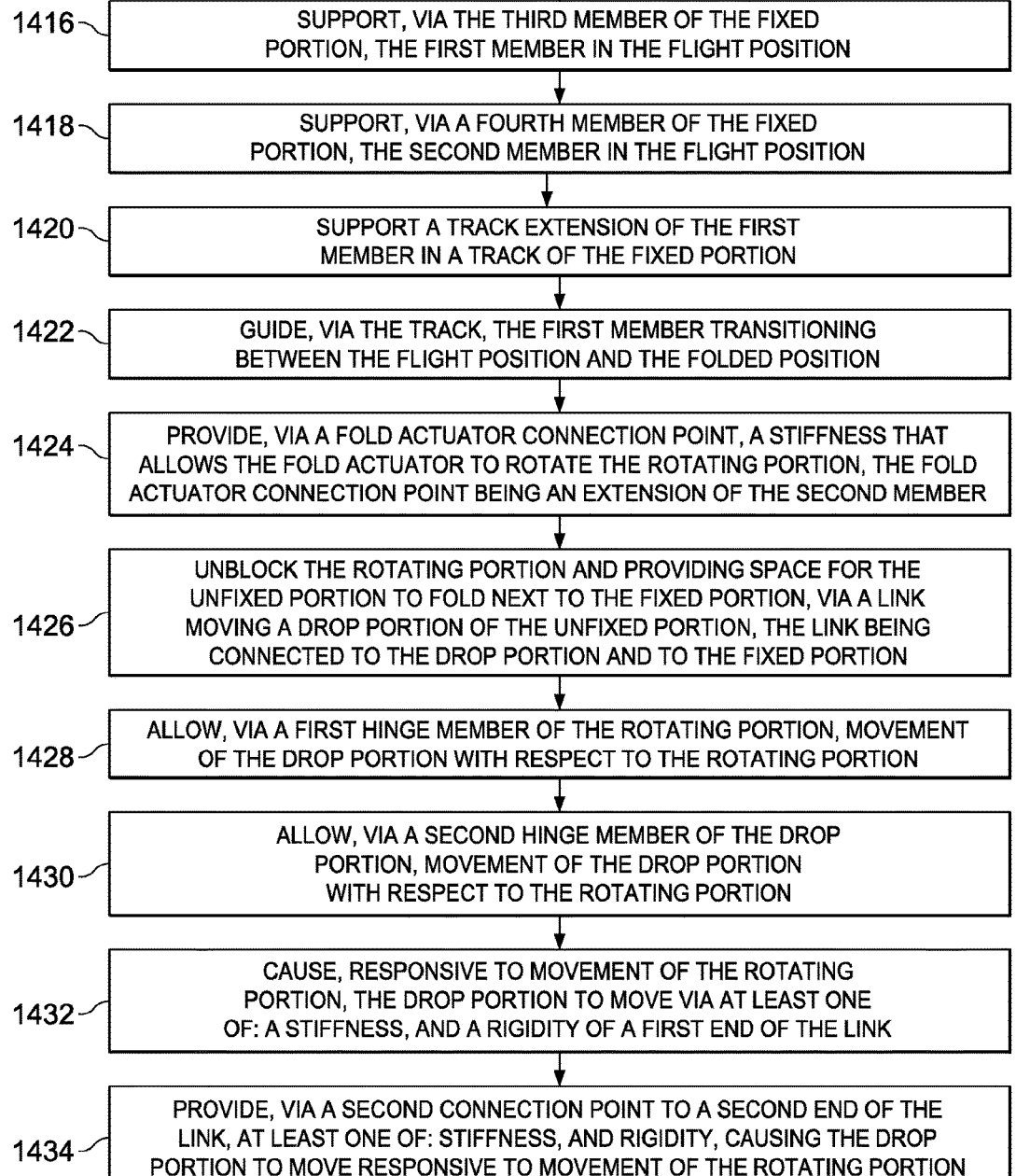

HORIZONTAL FOLDING WINGTIP

CROSS REFERENCE AND PRIORITY

The instant application is a divisional application and claims the benefit of U.S. patent application Ser. No. 13/964,072, issued as U.S. Pat. No. 9,296,469 on Mar. 29, 2016. U.S. patent application Ser. No. 13/964,072 claims the benefit of Provisional U.S. Patent Application No. 61/720,351, filed Oct. 30, 2012, and expired; the instant application is also a continuation-in-part of U.S. patent application Ser. No. 13/664,416, filed Oct. 30, 2012, which is a continuation-in-part of U.S. patent application Ser. No. 13/251,216 filed Oct. 1, 2011; the entire disclosures of each of the above noted applications are incorporated by reference herein.

FIELD OF THE DISCLOSURE

This disclosure relates to systems and methods for providing wings, and more specifically, to systems and methods for providing wings to enhance aircraft performance.

BACKGROUND OF THE DISCLOSURE

In today's commercial transport industry, it is highly desirable to design aircraft configurations that yield reduced fuel burn per seat-mile, as fuel burn per seat-mile is a metric of fuel efficiency. Efficient aircraft configurations are ever more important as fuel costs increase. Aircraft aerodynamic drag and fuel burn are generally reduced as the aspect ratio of the aircraft wing increases. Similarly, operating larger aircraft, carrying more passengers and payload, are generally more efficient between two destinations than flying several more trips with smaller aircraft. Thus, larger aircraft and aircraft with longer wingspans tend to be more efficient than aircraft with smaller wingspans. However, taxiway spacing and gate locations for most airports were established to accommodate aircraft with a certain wingspan.

Some attempts have been made to improve aircraft wing efficiency without adding wingspan. Winglets extending vertically from the wingtips have improved aircraft fuel efficiency without significantly increasing wingspan. However, the efficiency added by winglets may not be beneficial as that provided by extending the wingspan.

Thus, it is desired to provide an aircraft that can benefit from a long wingspan in flight, while being able to reduce the wingspan while operating at an airport.

SUMMARY

Illustrative embodiments provide for an apparatus of an aircraft, the apparatus may include a wing comprising an unfixed portion and a fixed portion. The unfixed portion movably may connect to the fixed portion. The unfixed portion may include a rotating portion to rotate the unfixed portion between a flight position and a folded position. The fixed portion may connect to the unfixed portion of the wing. A joint may allow rotation of the unfixed portion of the wing with respect to the fixed portion of the wing about a rotation axis.

Illustrative embodiments provide for a method of folding a wing that may include the unfixed portion and the fixed portion. The method may include actuating a fold actuator connected to the unfixed portion and the fixed portion; and rotating about a joint, a rotating portion of the unfixed portion between a flight position and a folded position, and simultaneously rotating, about a substantially horizontal axis with respect to rotating portion, a drop portion of the unfixed portion. Rotating the unfixed portion may be about a rotation axis of the joint, the rotation axis being one or more of: substantially vertical and substantially perpendicular to a span of the wing. Unblocking the rotating portion and providing space for the unfixed portion to fold next to the fixed portion, may be caused via a link moving the drop portion of the unfixed portion, may be included in the method. The method may also include moving the drop portion of the unfixed portion of the wing about a horizontal axis of the unfixed portion of the wing with respect to the unfixed portion of the wing via a hinge.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 6 is an illustration of a top plan view of a wing in a flight position in accordance with an illustrative embodiment;

FIG. 7 is an illustration of a wing in transition from a flight position to a folded position in accordance with an illustrative embodiment;

FIG. 8 is an illustration of a wing in a folded position in accordance with an illustrative embodiment;

FIG. 10 is an illustration of a cutaway top plan view of a wing in a folded position in accordance with an illustrative embodiment;

FIG. 11 is an illustration of a cross section side view of selected components of a wing fold system within a wing in a flight position in accordance with an illustrative embodiment;

FIGS. 13A-13C are diagrams of operations for a method of a wing fold system in accordance with an illustrative embodiment; FIG. 13A shows operations 1302 to 1328 of the method; FIG. 13B shows operations 1330 to 1356 of the method; FIG. 13C shows operations 1358 to 1378 of the method;

FIGS. 14A-14C are illustrations of a method of folding a wing of an aircraft in accordance with an illustrative embodiment; FIG. 14A shows operations 1402 to 1416 of the method; FIG. 14B shows operations 1418 to 1436 of the method; FIG. 14C shows operations 1438 to 1450 of the method;

DETAILED DESCRIPTION

Figure 1:
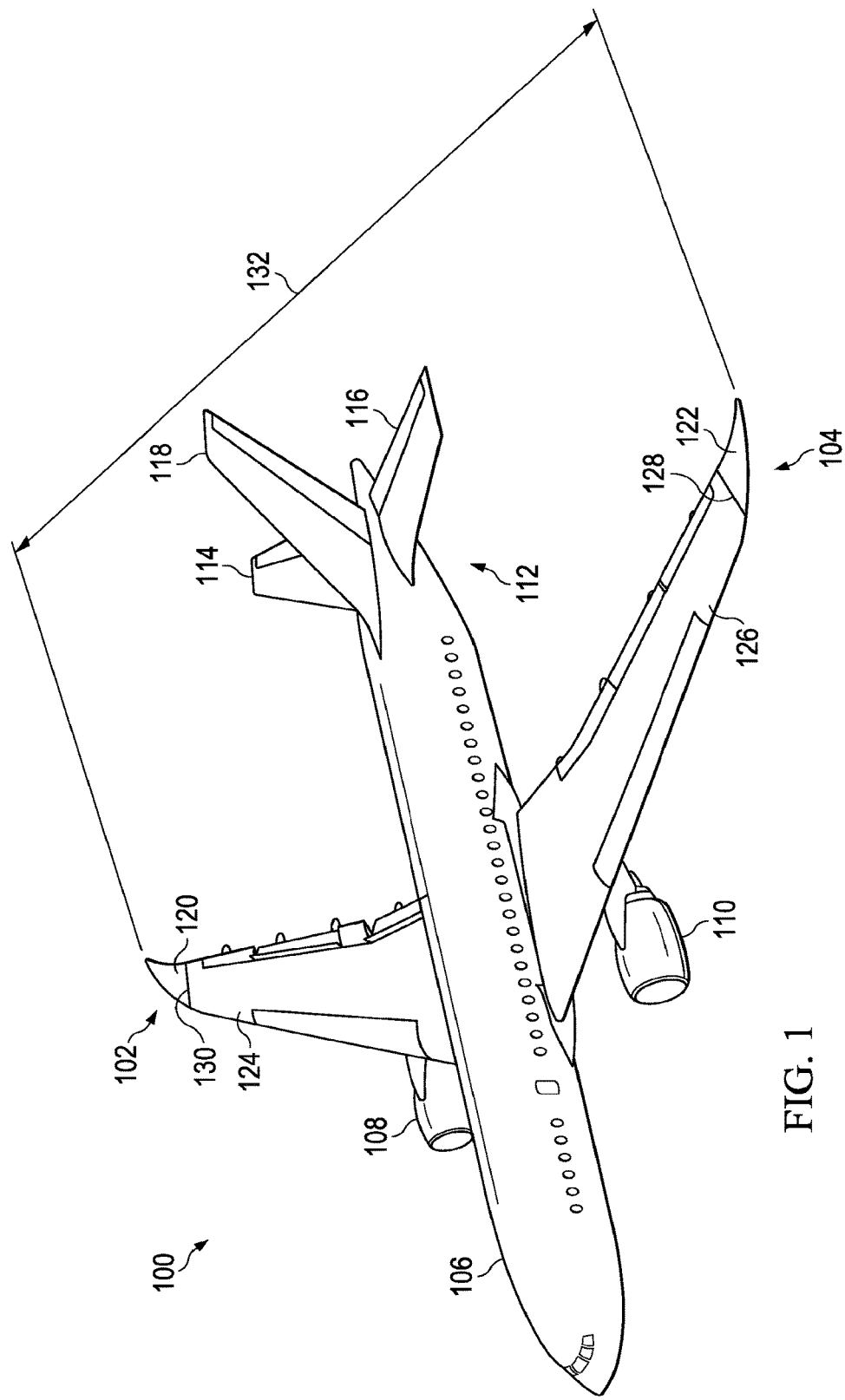
FIG. 1 is a diagram of an aircraft embodying a wing fold controller of a wing fold system in a flight position in accordance with an illustrative embodiment.
Figure 2:
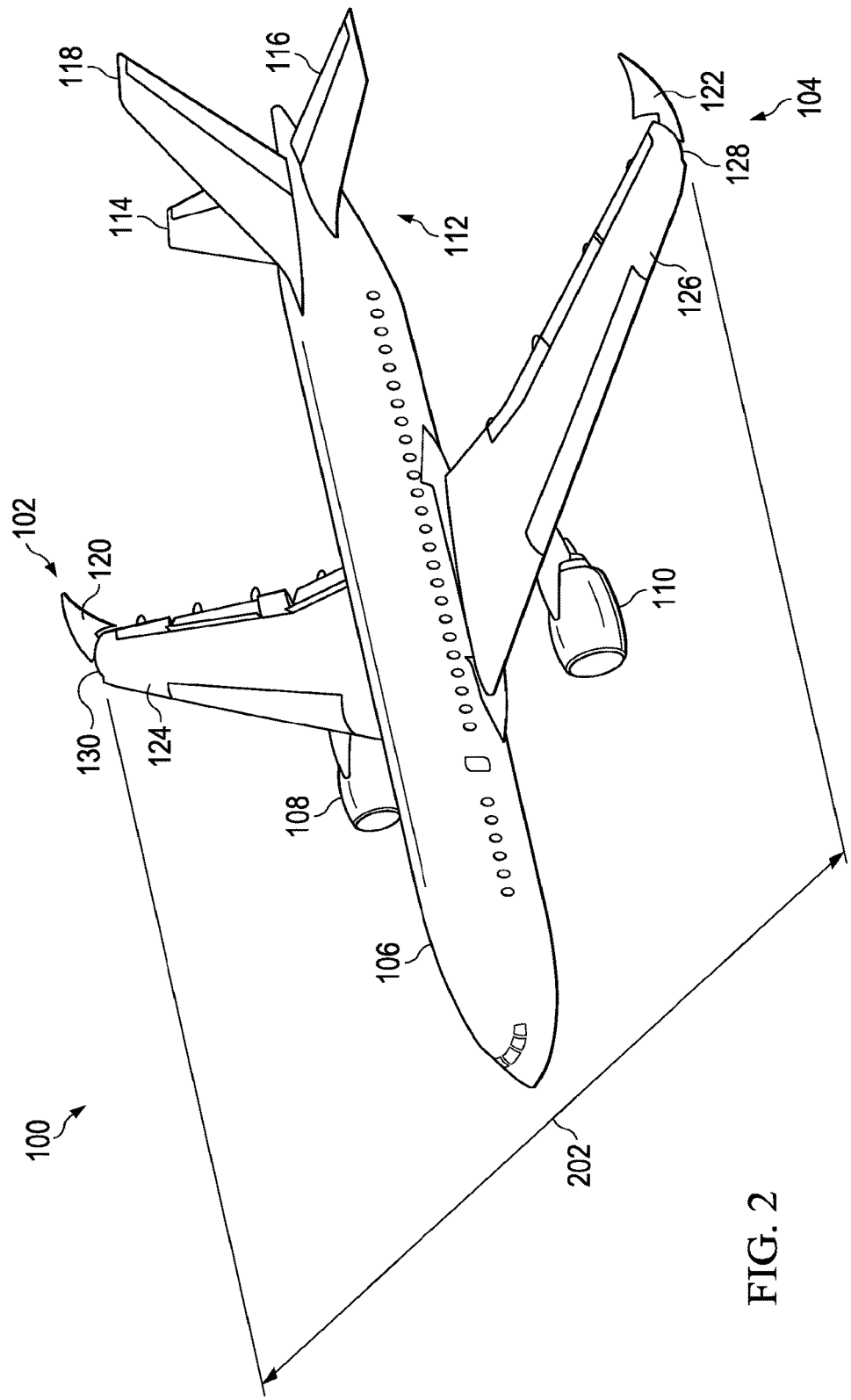
FIG. 2 is a diagram of an aircraft embodying a wing fold controller of a wing fold system in a folded position in accordance with an illustrative embodiment.

Unless otherwise noted and where appropriate, similarly named features and elements of an embodiment of one figure of the disclosure correspond to and embody similarly named features and elements of embodiments of the other figures of the disclosure. With reference now to the figures, and in particular, with reference to FIGS. 1 and 2, are diagrams of an aircraft embodying a wing fold controller of a wing fold system in accordance with an illustrative embodiment. In this illustrative example, aircraft 100 may include wing 102 and wing 104 attached to body 106; engine 108 attached to wing 102; engine 110 attached to wing 104. FIG. 1 depicts wings 102 and 104 of aircraft 100 in a flight position with flight wingspan 132 and FIG. 2 depicts wings 102 and 104 of aircraft 100 in a folded position with folded wingspan 202.

Wing 102 may include fixed portion 124 and unfixed portion 120. Fixed portion 124 may be an inboard portion of wing 102, which may be fixed to body 106. Similarly, wing 104 includes fixed portion 126 and unfixed portion 122. Wing 102 includes wing fold system 130 to move unfixed portion 120 with respect to fixed portion 124. Wing 104 may include wing fold system 128, which may move unfixed portion 122 with respect to fixed portion 126.

Body 106 may have tail section 112. Horizontal stabilizer 114, horizontal stabilizer 116, and vertical stabilizer 118 may be attached to tail section 112 of body 106.

Aircraft 100 is an example of an aircraft in which a wing fold system may be implemented in accordance with an illustrative embodiment. Wing fold system 128 and wing fold system 130 each may include a latch assembly in accordance with an illustrative embodiment.

Figure 3:
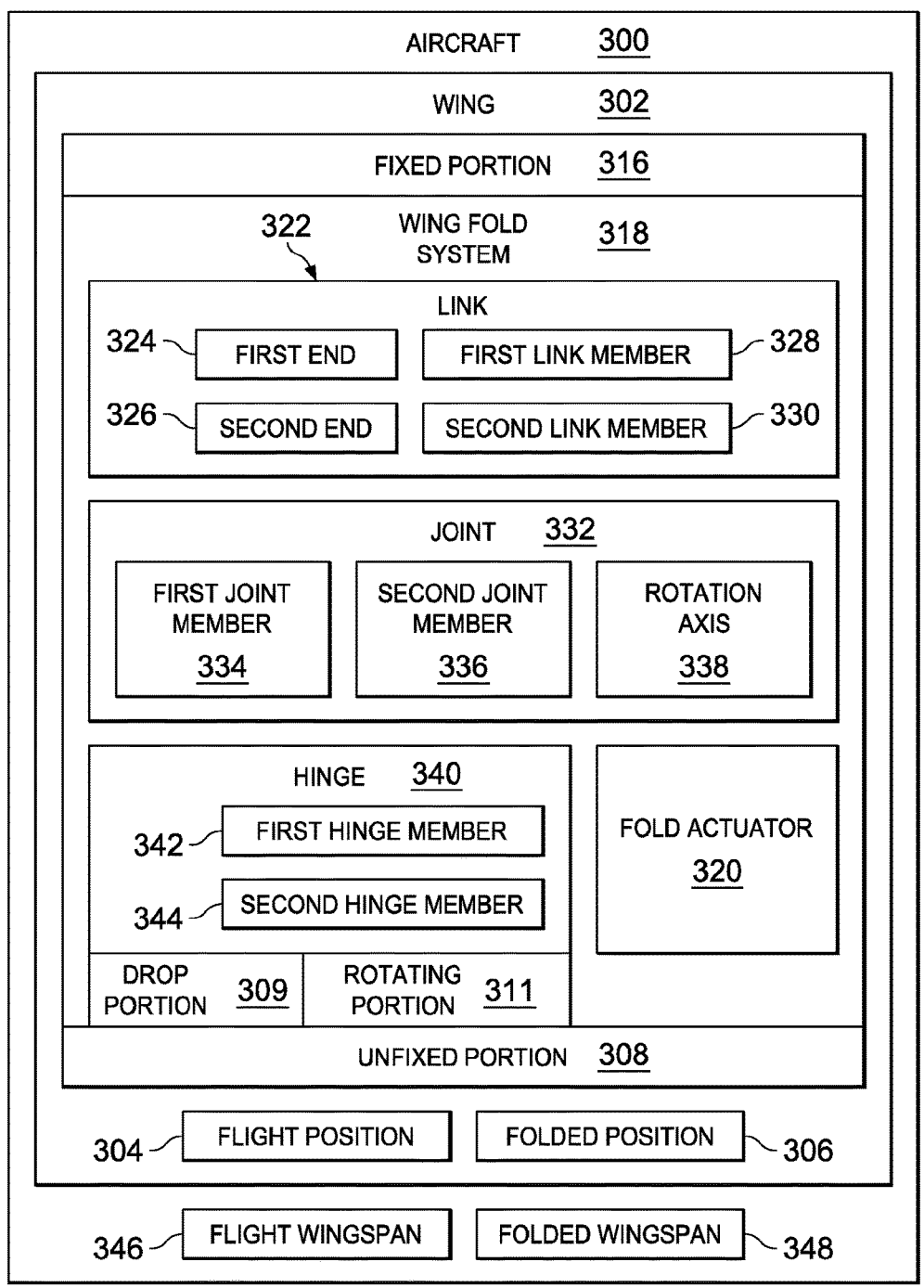
FIG. 3 is a block diagram of a wing of an aircraft with a wing fold system in accordance with an illustrative embodiment.

With reference to FIG. 3, FIG. 3 is a block diagram of a wing of an aircraft with a wing fold system in accordance with an illustrative embodiment. Aircraft 300 may be an illustrative embodiment of aircraft 100 in FIG. 1 and FIG. 2. Wing 302 may be an illustrative embodiment of wing 102 and of wing 104 of aircraft 100 of FIGS. 1 and 2.

Wing 302 may include: flight position 304, folded position 306, unfixed portion 308, drop portion 309, rotating portion 311, fixed portion 316, wing fold system 318, fold actuator 320, link 322, and joint 332. The folding of wing 302 may allow flight wingspan 346 to be reduced when the aircraft is on the ground to become folded wingspan 348. In this illustrative example, flight wingspan 346 and folded wingspan 348 may be examples of one implementation of flight wingspan 132 in FIG. 1 and folded wingspan 202 in FIG. 2.

Flight position 304 may be a state of wing 302. When wing 302 is in flight position 304, the wing may be ready for flight. For example, wing 102 and wing 104 of FIG. 1 are in flight position 304 and may be ready for flight.

Folded position 306 may be a state of wing 302. When wing 302 of an aircraft is in folded position 306, the aircraft may not ready for flight, but folded wingspan 348 may be smaller than flight wingspan 346. A shorter wingspan may allow aircraft 300 to operate on airports, such as but not limited to International Civil Aviation Organization "Code E" airports, that have requirements for wingspans that are less than flight wingspan 346.

In this illustrative example, unfixed portion 308 may be an example of one implementation of unfixed portion 120 of wing 102 and an embodiment of unfixed portion 122 of wing 104 of FIGS. 1 and 2. Unfixed portion 308 may rotate with respect to fixed portion 316 of wing 302 between flight position 304 of wing 302 and folded position 306 of wing 302. Unfixed portion 308 may be moveably connected to fixed portion 316. Unfixed portion 308 may include several features and components as described below.

Fixed portion 316 may be an embodiment of fixed portion 126 of wing 102 and an embodiment of fixed portion 126 of wing 104 of FIGS. 1 and 2. Fixed portion 316 may connect to unfixed portion 308. Fixed portion 316 may include several features and components as described below.

Wing fold system 318 may be an embodiment of wing fold system 128 and wing fold system 130 of FIGS. 1 and 2. Wing fold system 318 may move unfixed portion 308 between flight position 304 and folded position 306.

Link 322 may include: first end 324, second end 326, first link member 328, and second link member 330. First end 324 of link 322 may connect link 322 to drop portion 309 of unfixed portion 308. First end 324 may provide a first rigidity and/or a first stiffness to maintain the connection between link 322 and drop portion 309.

Second end 326 of link 322 may connect link 322 to fixed portion 316. Second end 326 may provide a second rigidity and/or a second stiffness to maintain the connection between link 322 and fixed portion 316.

Link 322 may connect to fixed portion 316 and drop portion 309 at an angle such that during rotation of unfixed portion 308 from flight position 304 to folded position 306, link 322 may exert a force on drop portion 309, and drop portion 309 may rotate downward about hinge 340. The force from rotating joint 332 may be a compressive force. Link 322 may be rotatable about an axis between first end 324 and second end 326 to allow the drop portion 309 to move or rotate as unfixed portion 308 transitions between flight position 304 and folded position 306.

Link 322 may cause rotation of drop portion 309 of unfixed portion 308 downward away from rotating portion 311 during transition of wing 302 from flight position 304 to folded position 306. Link 322 may cause rotation of drop portion 309 of unfixed portion 308 upward toward rotating portion 311 during transition of wing 302 from folded position 306 to flight position 304.

First link member 328 of link 322 rotatably may connect second link member 330 to one of: first end 324 and second end 326. First link member 328 may provide for rotation of first end 324 with respect to second end 326, which may provide for one or more of: a movement, and a rotation, of drop portion 309 with respect to rotating portion 311, of unfixed portion 308, as unfixed portion 308 may move or rotate with respect to fixed portion 316 between flight position 304 and folded position 306. First link member 328 may include a socket for a ball of second link member 330 that may allow rotational movement without linear movement.

Second link member 330 of link 322 rotatably may connect first link member 328 to the other of first end 324 and second end 326 with respect to first link member 328. Second link member 330 may provide for rotation of first end 324 with respect to second end 326, which may provide for one of more of movement and rotation of drop portion 309 with respect to rotating portion 311, of unfixed portion 308, as unfixed portion 308 may move or rotate with respect to fixed portion 316 between flight position 304 and folded position 306. Second link member 330 may include a ball for a socket of first link member 328 that may allow rotational movement without linear movement.

Joint 332 of wing fold system 318 may allow rotation of unfixed portion 308 of wing 302 with respect to fixed portion 316 of wing 302 about rotation axis 338. Joint 332 may include first joint member 334, second joint member 336, and rotation axis 338.

First joint member 334 may be a first member of joint 332. First joint member 334 may connect a second member of unfixed portion 308 to second joint member 336 of fixed portion 316. First joint member 334 may allow for rotation of unfixed portion 308 about rotation axis 338, which may be located at a center point of joint 332.

Second joint member 336 may be a second member of joint 332. Second joint member 336 may allow for unfixed portion 308 rotation about rotation axis 338 of joint 332. Second joint member 336 may connect a fourth member of fixed portion 316 to first joint member 334 of unfixed portion 308.

Rotation axis 338 of joint 332 may be one or more of a substantially vertical axis, an axis substantially parallel to a yaw axis of an aircraft to which wing 302 may be attached, and an axis perpendicular to wing 302 to allow for a horizontal folding motion of unfixed portion 308 with respect to fixed portion 316. A horizontal folding motion of unfixed portion 308 about rotation axis 338 may not require lifting the unfixed portion upward against an earth gravity force. A horizontal folding motion of unfixed portion 308 about rotation axis 338 may not require as much force as lifting unfixed portion 308 upward in a vertical folding motion. The lower force required for the horizontal folding motion may allow a less powerful, lighter, and/or more durable fold actuator 320 than may be required by currently used wing fold machinery that lifts a wingtip upward vertically, against earth's gravity.

Hinge 340 may include first hinge member 342 and second hinge member 344. Hinge 340 may connect drop portion 309 to rotating portion 311 of unfixed portion 308. Hinge 340 may allow for rotation of drop portion 309 of unfixed portion 308 of wing 302 about a substantially horizontal axis with respect to rotating portion 311 of unfixed portion 308 of wing 302.

First hinge member 342 may be a first member of hinge 340 and may be attached to rotating portion 311. Second hinge member 344 may be a second member of hinge 340 and may be attached to drop portion 309 of unfixed portion 308.

Figure 4:
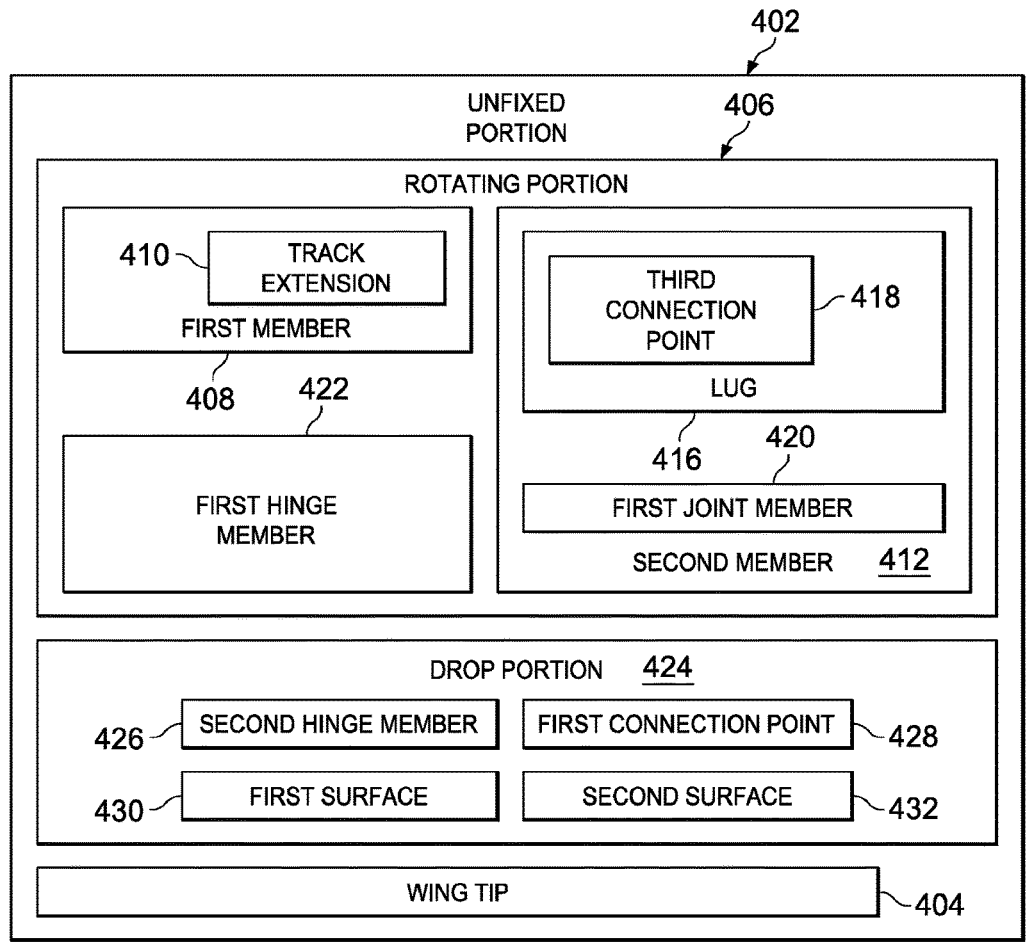
FIG. 4 is a block diagram of the unfixed portion of a wing of an aircraft with a wing fold system in accordance with an illustrative embodiment.

With reference to FIG. 4, FIG. 4 is a block diagram of the unfixed portion of a wing of an aircraft with a wing fold system in accordance with an illustrative embodiment. Unfixed portion 402 may be an illustrative embodiment of unfixed portion 120, 122, or 308 in FIG. 1 and FIG. 2, or FIG. 3. The wing may be an illustrative embodiment of wings 102, 104, and 302 of FIGS. 1, 2, and 3. The aircraft may be an illustrative embodiment of aircraft 100 of FIGS. 1 and 2. The wing fold system may be an illustrative embodiment of wing fold system 318 of FIG. 3.

Unfixed portion 402 may include wingtip 404, rotating portion 406, and drop portion 424. Unfixed portion 402 may be moveably connected to fixed portion 316 of FIG. 3. Fixed portion 316 may be an illustrative embodiment of fixed portion 124, 126, or 316 of FIGS. 1, 2, and 3.

Unfixed portion 402 may transition between flight position 304 and folded position 306 of FIG. 3, which may allow wingspan 132 (see FIG. 1) to become wingspan 202 (see FIG. 2).

Wingtip 404 may be a tip of wing 302 of FIG. 3. Wingtip 404 may be an outer section of unfixed portion 402. Wingtip 404 and/or unfixed portion 402 may be without moveable control surfaces. Wingtip 404 and/or unfixed portion 402 may be without leading edge devices. Wingtip 404 and/or unfixed portion 402 may be without fuel storage. Wingtip 404 and/or unfixed portion 402 may extend wingspan 132 for aircraft 100 of FIG. 1. Wingtip 404 and/or unfixed portion 402 may reduce drag, increase lift, and increase efficiency of aircraft 100. Wingtip 404 and/or unfixed portion 402 may be raked.

Rotating portion 406 may be a portion of unfixed portion 402 of wing 302 of FIG. 3 that may rotate relative to fixed portion 316. Rotating portion 406 may include first member 408, second member 412, and first hinge member 422. Rotating portion 406 of unfixed portion 402 may rotate between flight position 304 and folded position 306.

First member 408 may support unfixed portion 402 in and between flight position 304 and folded position 306. First member 408 may connect unfixed portion 402 to fixed portion 316 of wing 302 of FIG. 3. First member 408 may slide into third member 508 of FIG. 5 of fixed portion 316. In flight position 304, a section of first member 408 may nest within a third member of fixed portion 316 such that primary flight loads may be transferred from unfixed portion 402 to a main wing box in fixed portion 316. First member 408 nesting within a third member of fixed portion 316 may provide a continuous path across the wing fold joint that may support wing loading. This nesting connection may eliminate a need for additional internal wing strengthening elements and/or external features such as hinge lugs or pins or blister fairings, such as may be required on current wing fold designs. Eliminating the need for additional internal wing strengthening elements and/or external features may allow for a thinner wing box depth, less drag, and less weight than for current and/or alternative wing fold designs. Allowing a thinner wing box depth, less drag, and less weight than current wing fold designs may provide superior wing efficiency and aircraft fuel economy over current and/or alternative wing fold designs.

First member 408 may include track extension 410. First member 408 may serve as an extension of a wing spar for rotating portion 406 such that primary flight loads may be carried from rotating portion 406 to a main wing box in fixed portion 316.

Figure 5:
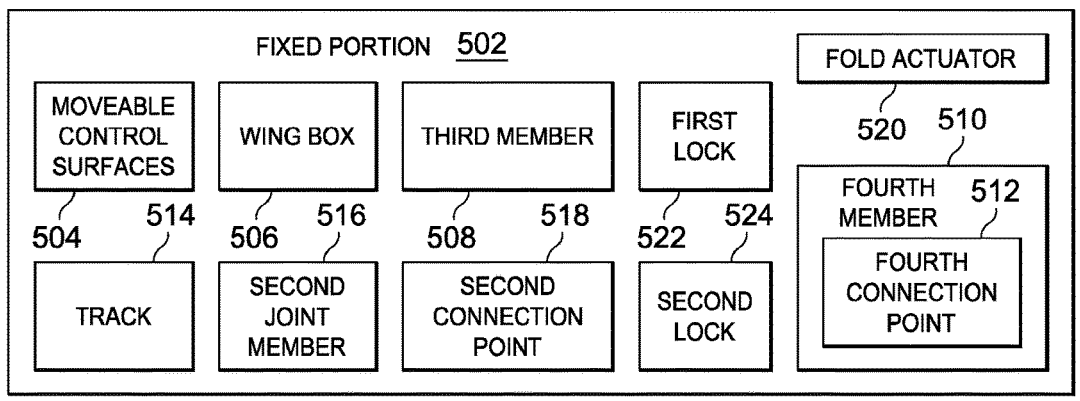
FIG. 5 is a block diagram of a fixed portion of a wing of an aircraft with a wing fold system in accordance with an illustrative embodiment.

Track extension 410 may fit into track 514 of FIG. 5 of fixed portion 316 of wing 302. Track extension 410 may support and may align unfixed portion 402 in and between folded position 306 and flight position 304.

Second member 412 may support unfixed portion 402 in and between flight position 304 and folded position 306. Second member 412 may include an extension and first joint member 420. The extension of second member 412 may be lug 416. Second member 412 may connect unfixed portion 402 to a fourth member in fixed portion 316 of wing 302. Second member 412 may slide into a fourth member of fixed portion 316. In flight position 304, a section of second member 412 may nest within a fourth member of fixed portion 316. Second member 412 may serve rotating portion 406 as an extension of a wing spar, such that primary flight loads may be carried from rotating portion 406 to a main wing box in fixed portion 316.

Second member 412 nesting within a fourth member of fixed portion 316 may provide a continuous path across the wing fold joint that may support wing loading. This nesting connection may eliminate a need for additional internal wing strengthening elements and/or external features such as hinge lugs or pins or blister fairings, such as may be required on current wing fold designs.

Eliminating the need for additional internal wing strengthening elements and/or external features may allow for a thinner wing box depth, less drag, and less weight than for current and/or alternative wing fold designs. Thinner wing box depth, less drag, and less weight than current wing fold designs may provide superior wing efficiency and aircraft fuel economy over current and/or alternative wing fold designs.

Lug 416 may be an extension of second member 412. Lug 416 may include third connection point 418.

Third connection point 418 may be a portion of lug 416. Third connection point 418 may be a fold actuator connection point that may connect lug 416, second member 412, and rotating portion 406 to fold actuator 320 of wing fold system 318. Third connection point 418 may provide a stiffness that allows rotating portion 406 to move in response to actuation of fold actuator 320.

In this illustrative example first joint member 420 may be an example of one embodiment of first joint member 334 in joint 332 and wing fold system 318 of FIG. 3. First joint member 420 may allow for rotation about rotation axis 338 of joint 332. First joint member 420 may connect to second joint member 516. Second joint member 516 may be attached to fixed portion 316 of wing 302. In this illustrative example second joint member 516 may be an example of one embodiment of second joint member 336 in joint 332 and wing fold system 318 of FIG. 3.

In this illustrative example, first hinge member 422 may be an example of one embodiment of first hinge member 342 of hinge 340 and wing fold system 318 of FIG. 3. First hinge member 422 may allow movement of drop portion 424 with respect to rotating portion 406.

Drop portion 424 may include second hinge member 426, first connection point 428, first surface 430, and second surface 432. Drop portion 424 may be a portion of unfixed portion 402 of wing 302. Drop portion 424 may move and provide space for rotating portion 406 to fold next to fixed portion 316 by moving out of a path of travel of rotating portion 406.

In this illustrative example, second hinge member 426 may be an example of one embodiment of second hinge member 344 of hinge 340 of wing fold system 318 of FIG. 3. Second hinge member 426 may allow movement of drop portion 424 with respect to rotating portion 406.

In this illustrative example, first connection point 428 may be an example of one embodiment of first end 324 and link 322 of FIG. 3. First connection point 428 may provide stiffness and/or rigidity that may cause drop portion 424 to move responsive to movement of rotating portion 406.

First surface 430 may be a first surface of drop portion 424 of wing 302 that may form a portion of a top surface of wing 302. First surface 430 may provide an aerodynamic surface for wing 302. First surface 430 may be smaller than second surface 432

Second surface 432 may be a second surface of drop portion 424 of wing 302 that may form a portion of a bottom surface of wing 302. Second surface 432 may provide an aerodynamic surface for wing 302. In this illustrative example, second surface 432 may be connected to first end 324 of link 322 of wing fold system 318 of FIG. 3. Second surface 432 may be larger than first surface 430. Second surface 432 being larger than first surface 430 may provide a space for first connection point 428 on second surface 432 that may allow for link 322 to connect to drop portion 424.

With reference to FIG. 5, FIG. 5 is a block diagram of a fixed portion of a wing of an aircraft with a wing fold system in accordance with an illustrative embodiment. The wing may be an illustrative embodiment of wings 102, 104, and 302 of FIGS. 1, 2, and 3. The aircraft may be an illustrative embodiment of aircraft 100 of FIGS. 1 and 2. The wing fold system may be an illustrative embodiment of wing fold system 318 of FIG. 3.

Fixed portion 502 may be connected to unfixed portion 402 of wing 302. Fixed portion 502 may include moveable control surfaces 504, wing box 506, third member 508, fourth member 510, track 514, second joint member 516, second connection point 518, fold actuator 520, first lock 522, and second lock 524.

Moveable control surfaces 504 may be surfaces of a wing of an aircraft that move to control the aircraft trajectory during flight of the aircraft. Moveable control surfaces 504 may control an aerodynamic shape of the wing to provide control of the aircraft. Moveable control surfaces 504 may include a flap, a slat, and/or an aileron.

Wing box 506 may be a structure that supports wing 302. Wing box 506 may connect between wing 302 of aircraft 100 and body 106 of aircraft 100.

Third member 508 may be a structure that may be a part of a leading edge of wing box 506. Third member 508 may support first member 408 of unfixed portion 402 when wing 302 may be in flight position 304. First member 408 may slide in to and out of third member 508 as wing 302 transitions between flight position 304 and folded position 306. Third member 508 may be formed to envelope three sides of first member 408 when wing 302 is in flight position 304.

Fourth member 510 may be a structure that may be a part of a trailing edge of wing box 506. Fourth member 510 may include fourth connection point 512. Fourth member 510 may support second member 412 of rotating portion 406 of unfixed portion 402 when wing 302 may be in flight position 304. Fourth member 510 may be formed to envelope three sides of second member 412 when wing 302 is in flight position.

Fourth connection point 512 may be a point of connection of fourth member 510 to fold actuator 320 of wing fold system 318. Fourth connection point 512 may be a fold actuator connection point that may connect fold actuator 320 to fixed portion 316.

Track 514 may be a curved member of fixed portion 502. Track 514 may support first member 408 of unfixed portion 402 in flight position 304, folded position 306, and transitions between flight position 304 and folded position 306. Track 514 may guide first member 408 of unfixed portion 402 through transitions between flight position 304 and folded position 306.

In this illustrative example, second joint member 516 may be one embodiment of second joint member 336 of joint 332 of wing fold system 318 of FIG. 3. Second joint member 516 may allow for rotation about rotation axis 338 of joint 332. Second joint member 516 may connect first joint member 420 of rotating portion 406 of unfixed portion 402 to fixed portion 316.

In this illustrative example, second connection point 518 may be one embodiment of a point of connection for link 322 of wing fold system 318 of FIG. 3. Second connection point 518 may connect to second end 326 of link 322.

Second connection point 518 may provide stiffness and/or rigidity that may cause a drop portion to move responsive to movement of rotating portion 406 of unfixed portion 402 of wing 302.

First lock 522 and second lock 524 may be located in fixed portion 502. Each lock may have a respective latch pin that may extend through an opening in first member 408 and third member 508. Each lock may retain first member 408 into a nested position within third member 508 when the wing 302 is in flight position 304. Each lock individually may prevent unfixed portion 402 from moving out of flight position 304.

The block diagram illustrations of FIGS. 3-5 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. Alternative examples may have alterations to those described and still be within the scope of one or more illustrative embodiments.

With reference to FIG. 6, FIG. 7, and FIG. 8, a series of top plan view illustrations of a wing is depicted in accordance with an illustrative embodiment. FIG. 6 is an illustration of a wing in a flight position in accordance with an illustrative embodiment; FIG. 7 is an illustration of a wing in transition from a flight position to a folded position in accordance with an illustrative embodiment; and FIG. 8 is an illustration of a wing in a folded position in accordance with an illustrative embodiment. As above, unless otherwise noted and where appropriate, similarly named features and elements of an embodiment of one figure of the disclosure correspond to and embody similarly named features and elements of embodiments of the other figures of the disclosure.

With reference to FIG. 6, a top plan view illustration of wing 602 in flight position 304 is depicted in accordance with an illustrative embodiment. Wing 602 may include fixed portion 604, drop portion 606, unfixed portion 608, rotation axis 610 of joint 332, first surface 612 of drop portion 606, and second surface 614 of drop portion 606. Rotating portion 311 of FIG. 3 may rotate about rotation axis 610.

First surface 612 may be visible from above wing 602. Second surface 614, which may be larger than first surface 612, may only be visible from below wing 602, and is therefore shown as a dashed line.

With reference to FIG. 7, a top plan view illustration of wing 702 in transition from flight position 304 to folded position 306 is depicted in accordance with an illustrative embodiment. Rotating portion 708 may be seen rotated, back toward tail section 112 and in toward body 106 of aircraft 100, about rotation axis 710. First member 704 of rotating portion 708 may be visible. Drop portion 706 may be seen rotated downward about hinge 712, away from rotating portion 708. Hinge 712 may connect rotating portion 708 and drop portion 706.

With reference to FIG. 8, a top plan view illustration of wing 802 in folded position 306 is depicted in accordance with an illustrative embodiment. When wing 802 is in folded position 306, first member 804 is more visible than in FIG. 7. Rotating portion 808 may be seen rotated, back toward tail section 112 and in toward body 106 of aircraft 100, about rotation axis 810. When wing 802 is in folded position 306, from a top view, drop portion 706 may be below rotating portion 808 and may no longer visible from above wing 802.

Figure 9:
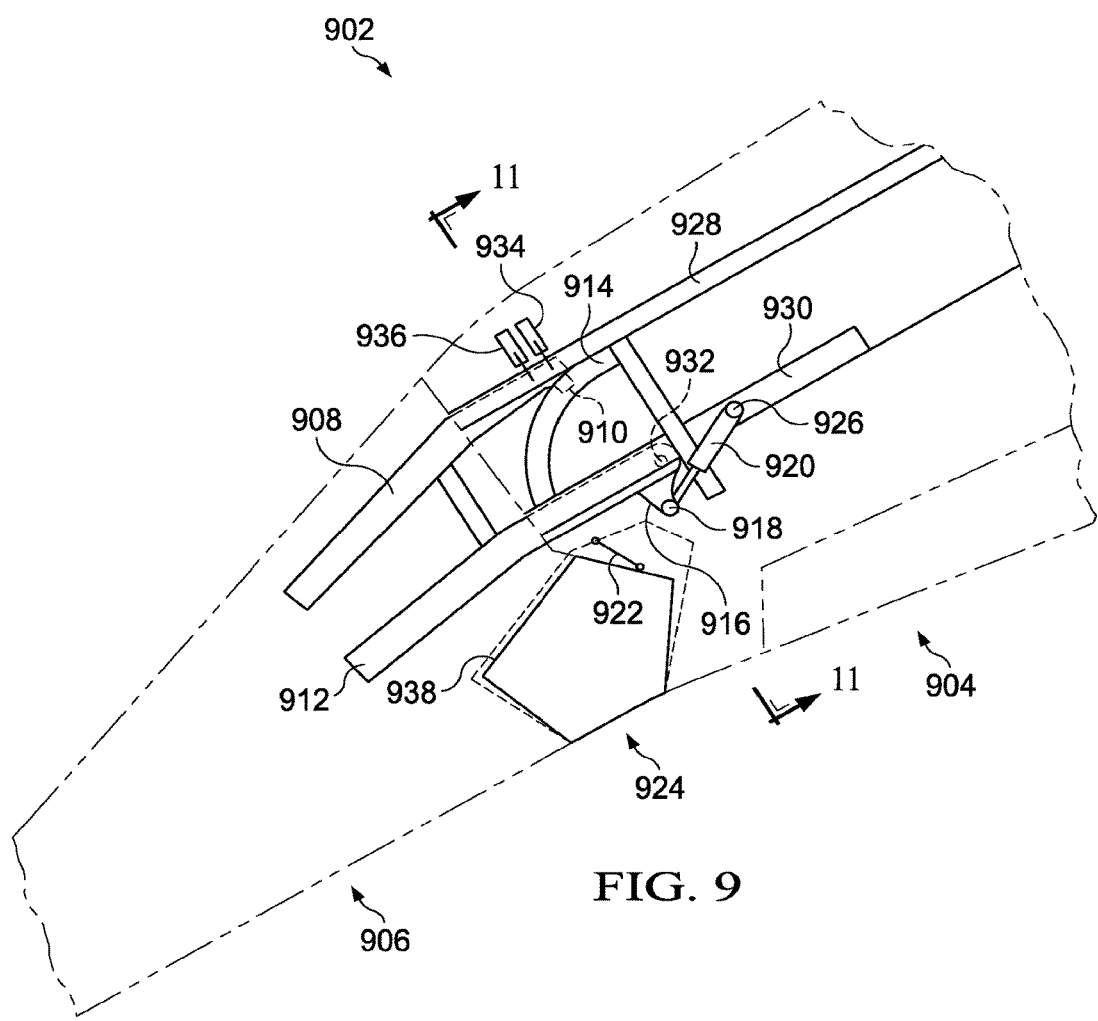
FIG. 9 is an illustration of a cutaway top plan view of a wing in a flight position in accordance with an illustrative embodiment

With reference to FIG. 9 and FIG. 10, a cutaway top plan view illustration of a wing with a wing fold system is depicted in accordance with one or more illustrative embodiments. In these illustrative examples, each of the above referenced features of wing 902 may be an embodiment corresponding to similarly named features of FIGS. 3, 4, and 5. Features shown in FIG. 9 and FIG. 10 may connect and interact as their similarly named features are described for FIGS. 3, 4, and 5. Wing 902 may be an illustrative embodiment of a top plan cutaway view of wing 102, wing 104, and wing 302 of FIGS. 1, 2, and 3. The wing fold system may be an illustrative embodiment of wing fold system 318 of FIG. 3. FIG. 9 depicts wing 902 in flight position 304. FIG. 10 depicts wing 1002 in folded position 306. FIG. 11 depicts a side cutaway view of fixed portion 904 of wing 902, marked as view 11-11 of FIG. 9.

With reference to FIG. 9, FIG. 9 is an illustration of a cutaway top plan view of a wing in a flight position in accordance with an illustrative embodiment. More specifically, a top plan view, with a wing skin cutaway, of selected interior components of wing fold system 318 in flight position 304 is depicted in accordance with an illustrative embodiment. Wing 902 may include fixed portion 904, rotating portion 906, first member 908 of rotating portion 906, track extension 910 of first member 908, second member 912 of rotating portion 906, track 914, lug 916 of second member 912, third connection point 918, fold actuator 920, link 922, drop portion 924, fourth connection point 926, third member 928 of fixed portion 904, fourth member 930 of fixed portion 904, joint 932, first lock 934, second lock 936, and hinge 938.

As depicted in FIG. 9, track extension 910 of first member 908 may be seen nested within third member 928. Additionally, a section of second member 912 may be seen nested within fourth member 930.

With reference to FIG. 10, FIG. 10 is an illustration of a cutaway top plan view of a wing in a folded position in accordance with an illustrative embodiment. More specifically, a top plan view, with wing skin cutaway, of selected interior components of wing fold system 318 in folded position 306 is depicted in accordance with an illustrative embodiment. Wing 1002 may include fixed portion 1004, rotating portion 1006, first member 1008 of rotating portion 1006, track extension 1010 of first member 1008, second member 1012 of rotating portion 1006, track 1014, lug 1016 of second member 1012, third connection point 1018, fold actuator 1020, link 1022, fourth connection point 1026, third member 1028 of fixed portion 1004, fourth member 1030 of fixed portion 1004, joint 1032, first lock 1034, and second lock 1036. In this view, drop portion 924 is not visible because it may be extended vertically down beneath rotating portion 1006. Fold actuator 1020 is shown in a retracted position after pulling lug 1016 in a counter clockwise arc from a position shown for lug 1016 in FIG. 9.

In folded position 306, first member 1008 may be disengaged from third member 1028. A majority of second member 1012 may be seen disengaged from fourth member 930. Track extension 1010 of first member 1008 may be engaged in track 1014. Second member 912 and rotating portion 906 may be seen as having rotated about rotation axis 338 which may be located at a center point of joint 1032.

With reference to FIG. 11, FIG. 11 is an illustration of a cross section side view of selected components of a wing fold system within a wing in a flight position in accordance with an illustrative embodiment. FIG. 11 depicts a cutaway view of wing 1102 from a side, marked as view 11-11 on wing 902 in FIG. 9. In this illustrative example, wing 1102 may an embodiment of wing 104 or wing 302, on aircraft 100 of FIG. 1, 2, or 3.

Wing 1102 may include a wing fold system 1104. Selected components of wing fold system 1104 may include: first lock 1106, first member 1108, track extension 1110 of first member 1108, second member 1112, track 1114, lug 1116 of second member 1112, third connection point 1118 to lug 1116 on second member 1112, third member 1120, fourth member 1122, latch pin 1124, and joint 1126.

Figure 12:
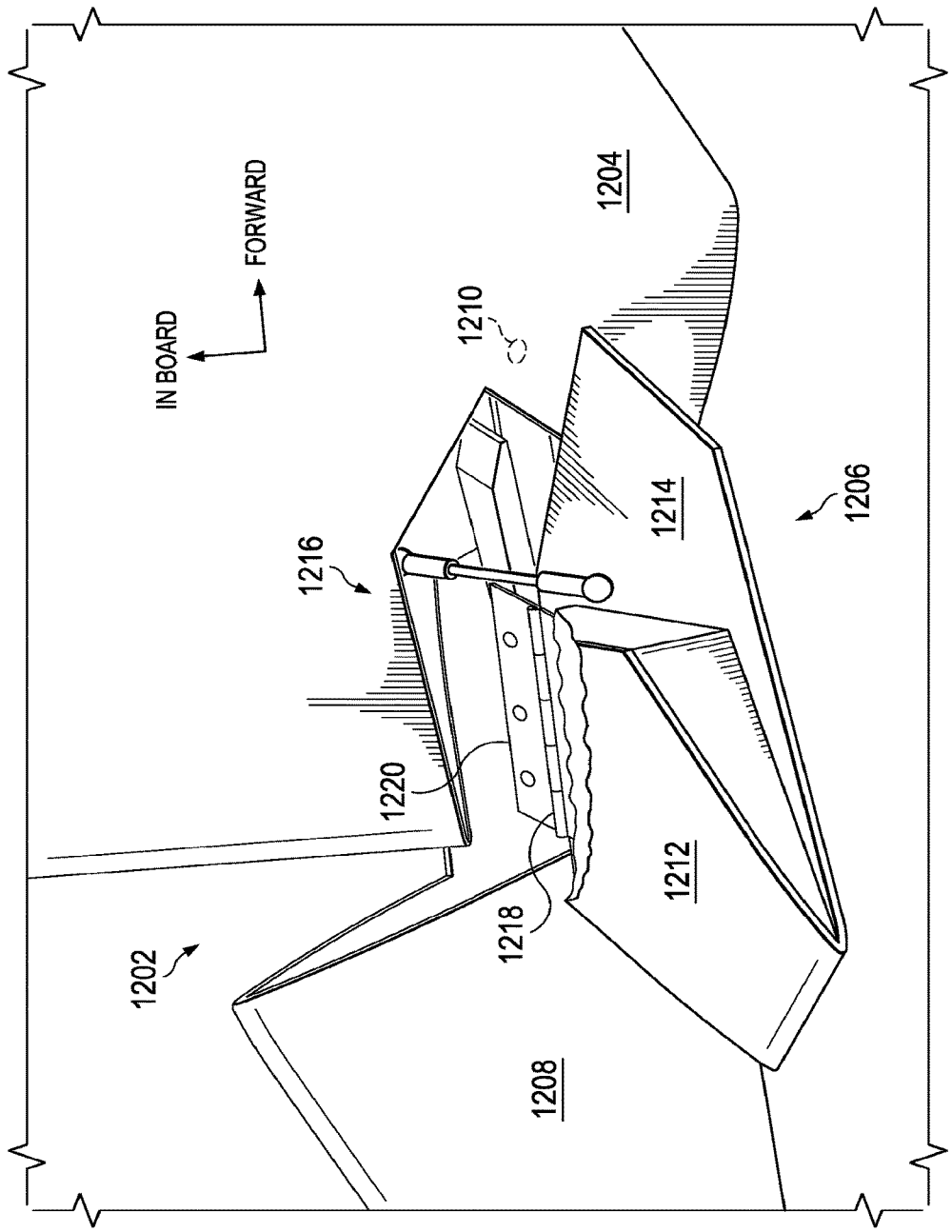
FIG. 12 is an illustration of a perspective view looking forward and up at a wing fold system in accordance with an illustrative embodiment.

With reference to FIG. 12, FIG. 12 is an illustration of a perspective view looking forward and up at a wing fold system in accordance with an illustrative embodiment. More specifically, wing fold system 1202 is depicted with drop portion 1212 pushed downward by link 1216 as rotating portion 1208 has moved aft toward folded position 306 from flight position 304.

Link is shown connected to interior side 1214 of second surface 1206. Drop portion 1212 is seen rotated downward and away from rotating portion 1208 about hinge 1218. First hinge member 1220 is visible with drop portion 1212 extended downward as shown.

Figure 13A:
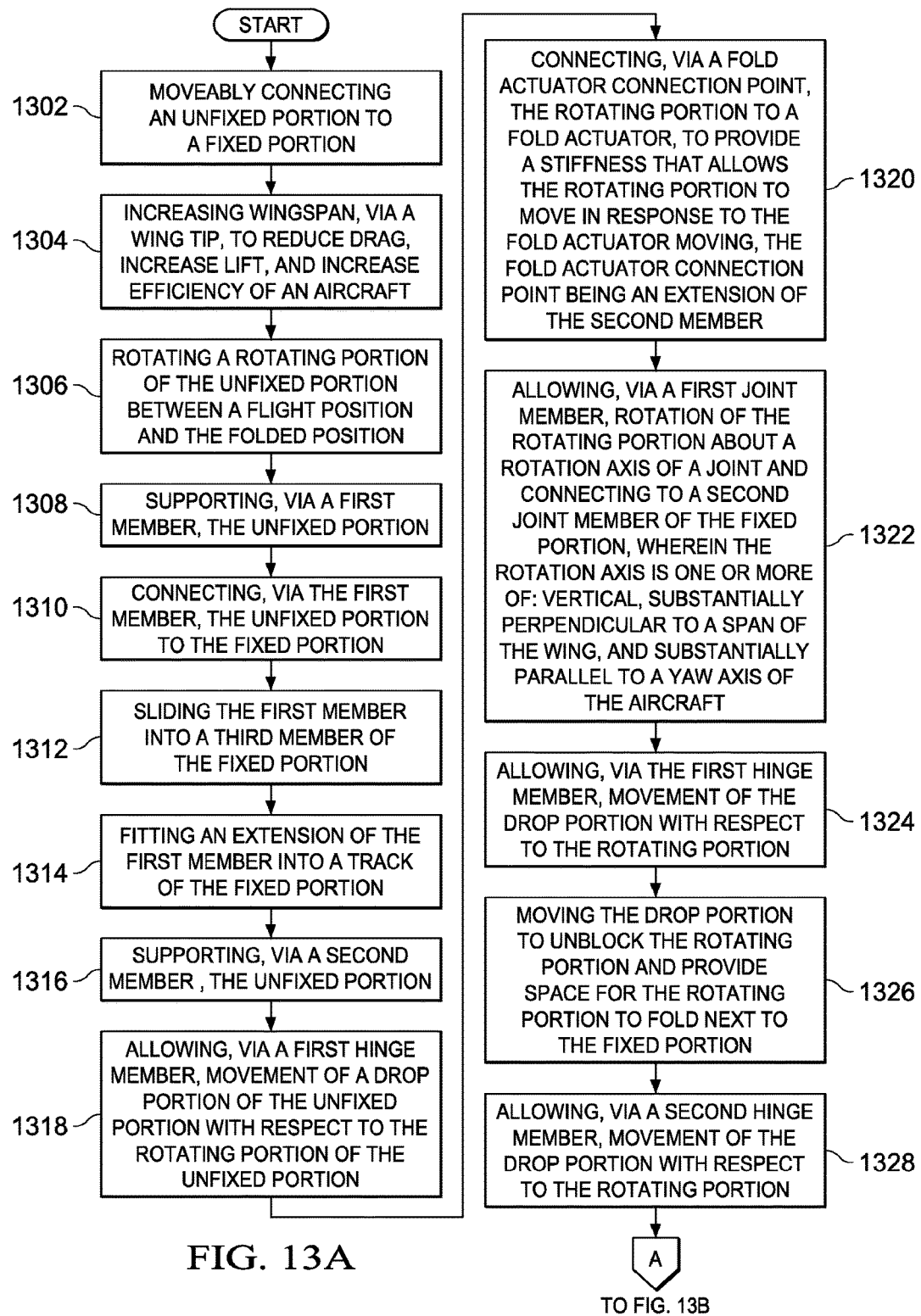
Figure 13C:
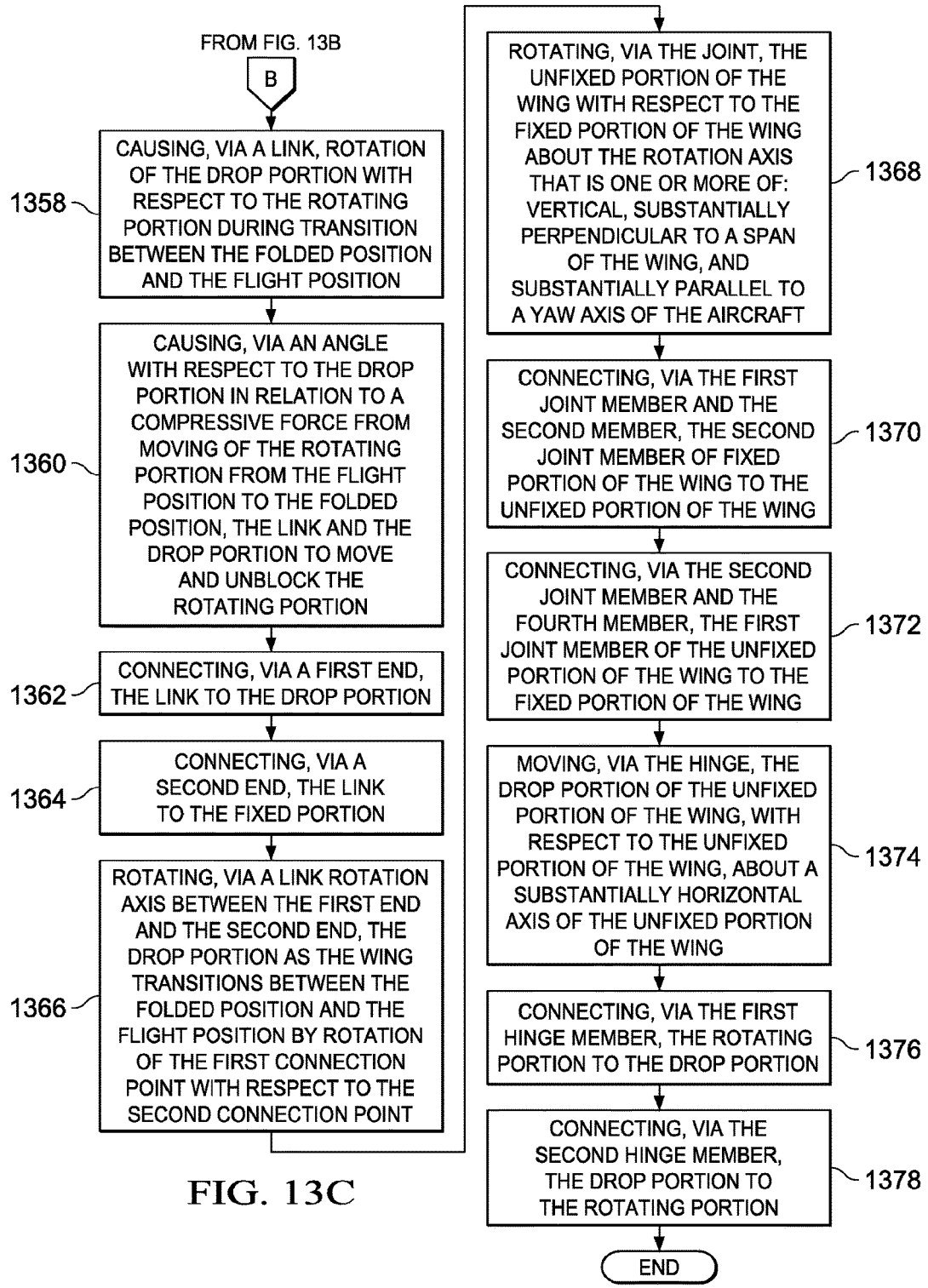

With reference to FIGS. 13A-13C, FIG. 13A-13C are diagrams of operations for a method of a wing fold system in accordance with an illustrative embodiment; FIG. 13A shows operations 1302 to 1328 of the method; FIG. 13B shows operations 1330 to 1356 of the method; FIG. 13C shows operations 1358 to 1378 of the method. The various features and elements of the embodiment of FIGS. 13A, 13B, and 13C that are used to describe method 1300 may correspond to similarly named features and elements of embodiments depicted in the other figures of this application.

Method 1300 may include operations listed below. Method 1300 may start with operation 1302 and end after operation 1378. Operations listed for method 1300 may be performed in an order other than that presented. Some operations may be performed simultaneously. Some operations may be omitted. Operations other than those listed may be added. Performance of some operations, or ordering of operations, may be dependent upon a beginning state of the wing, such as a flight position or a folded position, or being in transition between states.

In operation 1302, an unfixed portion of the wing with the wing fold system may be moveably connected to a fixed portion of the wing with the wing fold system. In being moveably connected, the unfixed portion may rotate or otherwise move with respect to the fixed portion.

In operation 1304, a wingtip may increase a wingspan. Increasing wingspan may reduce drag, increase lift, and increase efficiency of an aircraft. Increase of the wingspan may be by movement of the unfixed portion comprising the wingtip with regards to the fixed portion of one or more wings.

In operation 1306, a rotating portion of the unfixed portion may rotate between a flight position and a folded position. The rotation may be actuated by a fold actuator of the wing fold system. The fold actuator may be connected to one or more of the unfixed portion and the fixed portion.

In operation 1308, a first member of the unfixed portion may support the unfixed portion. Support may be provided by a rigidity and/or a stiffness of the first member.

In operation 1310, the first member of the unfixed portion may connect the unfixed portion to the fixed portion. The connection may be provided through the use of one or more joints and/or members included within the wing.

In operation 1312, the first member of the unfixed portion may slide into a third member of the fixed portion. The sliding may be aided by additional structures or materials. Additional structures or materials may include bearings and lubrication.

In operation 1314, an extension of the first member of the unfixed portion may fit into a track of the fixed portion. Fitment of the first member into the track may facilitate sliding of the first member with respect to the track.

In operation 1316, a second member of the unfixed portion may support the unfixed portion. Support may be provided by a rigidity and/or a stiffness of the second member.

In operation 1318, a first hinge member may allow movement of a drop portion of the unfixed portion with respect to a rotating portion of the unfixed portion. The first hinge member may be connected to the unfixed portion. The movement may be a rotation downward of the drop portion with respect to the rotating portion to facilitate a transition of the wing between the flight position and the folded position. The movement may occur simultaneous to the rotation of the rotating portion.

In operation 1320, a fold actuator connection point may connect the rotating portion of the unfixed portion of a wing to a fold actuator. The connection may provide a stiffness that allows the rotating portion to move in response to the fold actuator moving. The fold actuator connection point may be an extension of the second member. The extension of the second member may be a lug.

In operation 1322, a first joint member of a joint of the wing fold system may allow for rotation of the rotating portion of the unfixed portion of the wing about a rotation axis of the joint. The first joint member may connect to a second joint member of the fixed portion. The rotation axis may be one or more of: vertical, substantially perpendicular to a span of the wing, and substantially parallel to a yaw axis of the aircraft.

In operation 1324, the first hinge member may allow movement of the drop portion of the unfixed portion of the wing with respect to the rotating portion of the unfixed portion. The movement allowed by the first hinge member may be a rotational movement of the drop portion. The first hinge member may be connected to the rotating portion.

In operation 1326, the drop portion may move to unblock the rotating portion and provide space for the rotating portion to fold next to the fixed portion of the wing. Movement of the drop portion may be a clockwise rotation or a counterclockwise rotation to move the drop portion above or below the fixed portion.

In operation 1328, a second hinge member may allow for movement of the drop portion of the unfixed portion with respect to the rotating portion of the wing. The movement allowed by the second hinge member may be a rotational movement of the drop portion. The second hinge member may be connected to the drop portion.

In operation 1330, a first connection point may connect the drop portion of the unfixed portion to a first end of a link of the wing fold system. The connection may allow for the transfer of movement forces between the drop portion and the link.

In operation 1332, the first connection point may provide a stiffness and/or a rigidity, which may cause the drop portion to move responsive to movement of the rotating portion of the unfixed portion. The stiffness and/or the rigidity may be provided through the use of materials such as metals, alloys, or composites, including steel, aluminum, carbon fiber, other materials of like stiffness and/or rigidity, and any combination thereof.

In operation 1334, a first surface of a drop portion of the unfixed portion of a wing may provide an aerodynamic surface for the wing. The first surface may be a top surface of the drop portion.

In operation 1336, a second surface of the drop portion may provide an aerodynamic surface for the wing. The second surface may be a bottom surface of the drop portion. The second surface may have a larger area than the first surface.

In operation 1338, the second surface of a drop portion may connect the drop portion to the link. Connecting the second surface of the drop portion to the link may allow for the transfer of force between the drop portion and the link. The drop portion may rotate as the unfixed portion moves. The drop portion may rotate about the hinge.

In operation 1340, the fixed portion of a wing may be connected to the unfixed portion of the wing. Connecting the fixed portion to the unfixed portion may allow for changing an overall wingspan of an aircraft via movement of the unfixed portion.

In operation 1342, one or more moveable control surfaces of the fixed portion of the wing may control an aerodynamic shape of the wing. Controlling the aerodynamic shape of the wing may allow for control of an aircraft during flight. All moveable control surfaces may be located on the fixed portion of the wing.

In operation 1344, a wing box may connect the wing to a body of the aircraft. Connecting the wing to the body may allow for the wing to provide lift to the aircraft during flight.

In operation 1346, a third member of the fixed portion may support the first member of the unfixed portion in the flight position. The third member may support the first member and may secure the unfixed portion to the fixed portion in the flight position.

In operation 1348, a fourth member of the fixed portion may support the second member in the flight position. The fourth member may support the second member and may secure the unfixed portion to the fixed portion in the flight position.

In operation 1350, the track of the unfixed portion of the wing may support the first member of the unfixed portion in the flight position, the folded position, and transition between the flight position and the folded position. The track of the unfixed portion of the wing may guide the first member of the unfixed portion in transition between the flight position and the folded position. The track may include one or more extensions juxtaposed with one or more extensions of the first member to provide for the support and guidance.

In operation 1352, the second joint member of the fixed portion may allow rotation of the unfixed portion about the rotation axis of the joint of the wing fold system. Allowing the rotation may provide for changing an overall wingspan by rotation of the unfixed portion.

In operation 1354, the second joint member of the unfixed portion may connect the first joint member of the rotating portion of to the fixed portion. Connecting the first joint member to the second joint member may allow for alignment of the unfixed portion to the fixed portion.

In operation 1356, a second connection point to a second end of the link may provide a stiffness and/or a rigidity. The stiffness and/or the rigidity may cause the drop portion of the unfixed portion to move responsive to movement of the rotating portion via force transferred through the link.

In operation 1358, the link may cause rotation of the drop portion with respect to the rotating portion during transition between the folded position and the flight position. The link may terminate contact of the drop portion with the fixed portion, and may cause the rotation to move the drop portion downward and out of the way of the unfixed portion, as the wingtip may move closer to the fixed portion as the wing transitions from the flight position to the folded position. The link may cause the rotation to move the drop portion upward and in contact with the fixed portion, as the wingtip may move away from the fixed portion as the wing transitions from the folded position to the flight position.

In operation 1360, an angle, with respect to the drop portion in relation to a compressive force from moving of the rotating portion of the unfixed portion from the flight position to the folded position, may cause the drop portion to move and unblock the rotating portion. The causing of the drop portion to move and unblock the rotating portion may provide enough space for the unfixed portion to fold next to the fixed portion and reduce the overall wingspan.

In operation 1362, a first end of the link may connect the link to the drop portion. Connecting the link to the drop portion may allow for the transfer of force between the link and the drop portion as the unfixed portion moves with respect to a fixed portion of the wing. The first end of the link may connect to an interior side of the second surface of the drop portion.

In operation 1364, a second end of the link may connect the link to the fixed portion of the wing. Connecting the link to the fixed portion may allow for the transfer of force between the link and the fixed portion as the unfixed portion of the wing moves with respect to the fixed portion.

In operation 1366, a link rotation axis between the first end of the link and the second end of the link may rotate the drop portion as the wing transitions between the folded position and the flight position by rotation of a first connection point between the link and the drop portion with respect to second connection point between the link and the fixed portion. Rotation about the link rotation axis may allow for the drop portion to be connected to the rotating portion and the link while forces transferred via the link may cause the drop portion to move out of the way of the rotating portion as the unfixed portion may fold next to the fixed portion.

In operation 1368, the joint of the wing fold system may allow rotation of the unfixed portion of the wing with respect to the fixed portion of the wing about the rotation axis that may be one or more of: vertical, substantially perpendicular to a span of the wing, and substantially parallel to a yaw axis of the aircraft. Orientation of the rotation axis may allow for a horizontal rotation of the unfixed portion with respect to the fixed portion that requires less force as compared to a vertical rotation of the unfixed portion with respect to the fixed portion. A lower force requirement may allow for a wing folding system with smaller and/or lighter components than those used by current wing fold systems.

In operation 1370, the first joint member of the joint and the second member of the rotating portion of the unfixed portion may connect the second joint member of the fixed portion to the unfixed portion. The first joint member connecting the second joint member to the unfixed portion may allow for movement of the unfixed portion about the joint.

In operation 1372, the second joint member of the joint of the wing fold system of the wing and the fourth member of the fixed portion of the wing may connect the first joint member of the unfixed portion of the wing to the fixed portion of the wing. The second joint member connecting the first joint member to the fixed portion may allow for movement of the unfixed portion about the joint.

In operation 1374, the hinge of the wing fold system may move the drop portion of the unfixed portion of the wing, with respect to the unfixed portion of the wing, about a substantially horizontal axis of the unfixed portion. Moving the drop portion may provide a space that allows the unfixed portion to fold next to the fixed portion of the wing.

In operation 1376, the first hinge member of the rotating portion may connect the rotating portion to the drop portion. Connecting the rotating portion to the drop portion may allow for the drop portion to rotate along with the rotating portion in transition between the flight position and the folded position.

In operation 1378, the second hinge member of the drop portion may connect the drop portion to the rotating portion. Connecting the drop portion to the rotating portion may allow for the drop portion to rotate along with the rotating portion in transition between the flight position and the folded position. In an alternative embodiment, the hinge of the wing fold system may connect the drop portion to the fixed portion with the link connecting between the drop portion and the rotating portion.

Figure 14C:
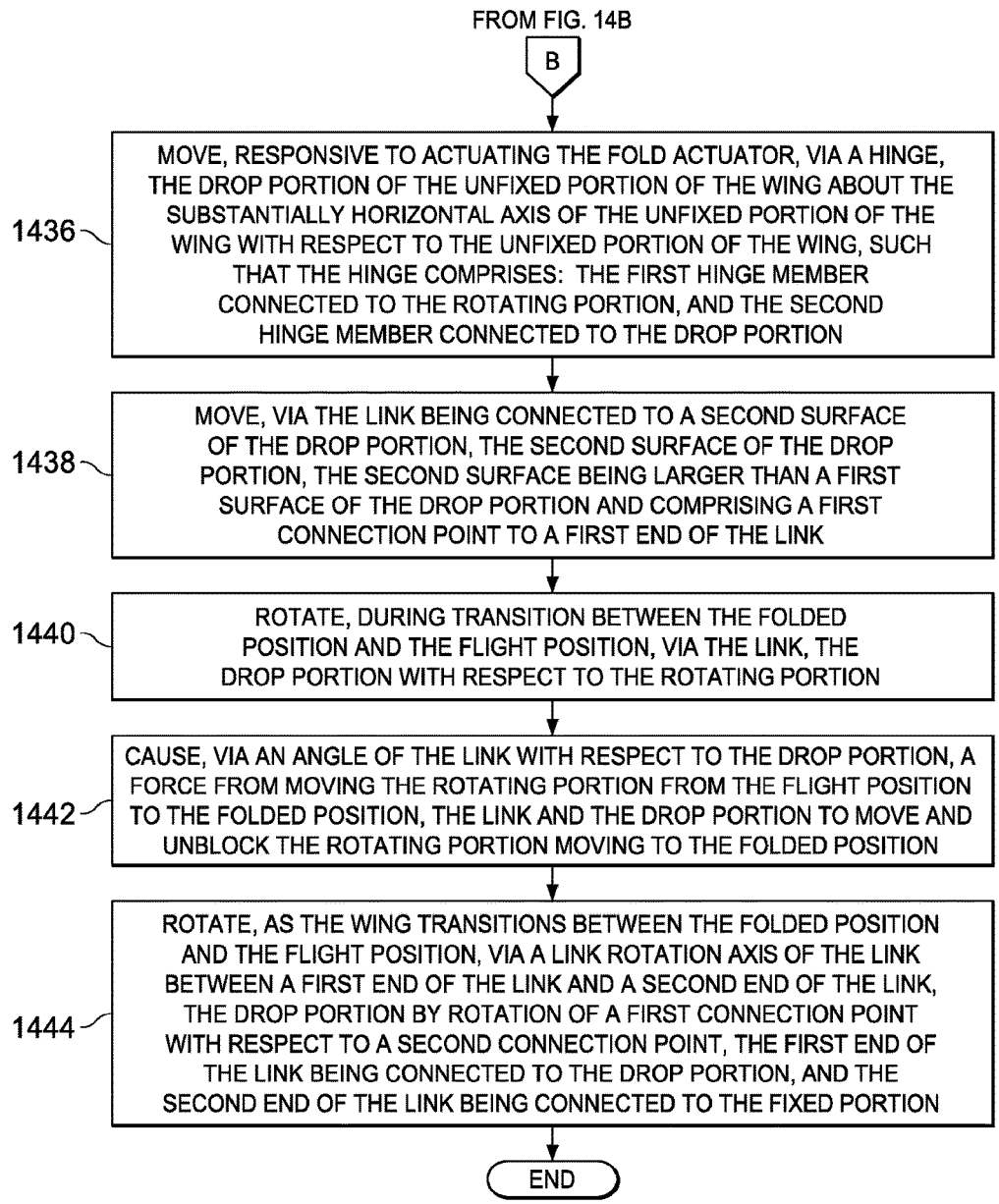

Referring now to FIGS. 14A-14C, FIGS. 14A-14C are illustrations of a method of folding a wing of an aircraft in accordance with an illustrative embodiment; FIG. 14A shows operations 1402 to 1414 of the method; FIG. 14B shows operations 1416 to 1434 of the method; FIG. 14C shows operations 1436 to 1444 of the method. More specifically, method 1400 may be a method of folding a wing of an aircraft comprising an unfixed portion and a fixed portion.

Method 1400 may include operations listed below. Method 1400 may start with operation 1402 and end after operation 1444. Operations listed for method 1400 may be performed in an order other than that presented. Some operations may be performed simultaneously. Some operations may be omitted. Operations other than those listed may be added. Performance of some operations, or ordering of operations, may be dependent upon a beginning state of the wing, such as a flight position or a folded position, or being in transition between states.

Method 1400 may begin by actuating a fold actuator, the actuator being connected to the unfixed portion and the fixed portion (operation 1402). Method 1400 may include, rotating about a joint, responsive to the fold actuator actuating while the aircraft may be on the ground, a rotating portion of the unfixed portion between a flight position and folded position, such that the rotating may be about a rotation axis of the joint, the rotation axis being one or more of: substantially vertical, and substantially perpendicular to a span of the wing (operation 1404).

Method 1400 may include simultaneously rotating, about a substantially horizontal axis with respect to the rotating portion, a drop portion of the unfixed portion (operation 1406).

Method 1400 may include supporting, via a first member of the rotating portion, the unfixed portion, the unfixed portion comprising the rotating portion (operation 1408). Additionally, method 1400 may include sliding, in response to actuating the fold actuator, the first member with respect to a third member of the fixed portion (operation 1410).

Method 1400 may include allowing movement, via a first hinge member, of a drop portion of the unfixed portion with respect to the rotating portion of the unfixed portion, a second member of the rotating portion comprising the first hinge member (operation 1412). Method 1400 may also include allowing for rotation, via a first joint member of the second member, of the rotating portion about the rotation axis of the joint (operation 1414).

Method 1400 may include supporting, via the third member of the fixed portion, the first member in the flight position (operation 1416). Method 1400 may also include supporting, via a fourth member of the fixed portion, the second member in the flight position (operation 1418). Additionally, method 1400 may include supporting a track extension of the first member in a track of the fixed portion (operation 1420).

Accordingly, method 1400 may include guiding, via the track, the first member transitioning between the flight position and the folded position (operation 1422). Method 1400 may also include providing, via a fold actuator connection point, a stiffness that allows the fold actuator to rotate the rotating portion, the fold actuator connection point being an extension of the second member (operation 1424).

Additionally, method 1400 may include unblocking the rotating portion and providing space for the unfixed portion to fold next to the fixed portion, via a link moving a drop portion of the unfixed portion, the link being connected to the drop portion and to the fixed portion (operation 1426). Method 1400 may further include allowing, via a first hinge member of the rotating portion, movement of the drop portion with respect to the rotating portion (operation 1428) and allowing, via a second hinge member of the drop portion, movement of the drop portion with respect to the rotating portion (operation 1430); thus causing, responsive to movement of the rotating portion, the drop portion to move via at least one of: a stiffness, and a rigidity of a first end of the link (operation 1432); and providing, via a second connection point to a second end of the link, at least one of: stiffness, and rigidity, causing the drop portion to move responsive to movement of the rotating portion (operation 1434).

Method 1400 may include moving, responsive to actuating the fold actuator, via a hinge, the drop portion of the unfixed portion of the wing about a horizontal axis of the unfixed portion of the wing with respect to the unfixed portion of the wing, such that the hinge comprises: the first hinge member connected to the rotating portion, and the second hinge member connected to the drop portion (operation 1436). Method 1400 may also include moving, via the link being connected to a second surface of the drop portion, the second surface of the drop portion, the second surface being larger than a first surface of the drop portion and comprising a first connection point to a first end of the link (operation 1438).

Method 1400 may include rotating, during transition between the folded position and the flight position, via the link, the drop portion with respect to the rotating portion (operation 1440). Method 1400 may also include causing, via an angle of the link with respect to the drop portion, a force from moving the rotating portion from the flight position to the folded position, the link and the drop portion to move and unblock the rotating portion moving to the folded position (operation 1442).

Additionally, method 1400 may include rotating, as the wing transitions between the folded position and the flight position, via a link rotation axis of the link between a first end of the link and a second end of the link, the drop portion by rotation of a first connection point with respect to a second connection point, the first end of the link being connected to the drop portion, and the second end of the link being connected to the fixed portion (operation 1444).

Method 1400 may also include reducing drag and increasing lift of the wing, and increase efficiency of the aircraft, via increasing a wingspan of the wing, via a wingtip of the unfixed portion and controlling, via moveable control surfaces, an aerodynamic shape of the wing. Method 1400 may also include transferring a load from the unfixed portion to a wing box of the fixed portion via a first member of the unfixed portion contacting a third member of the fixed portion.

Figure 15:
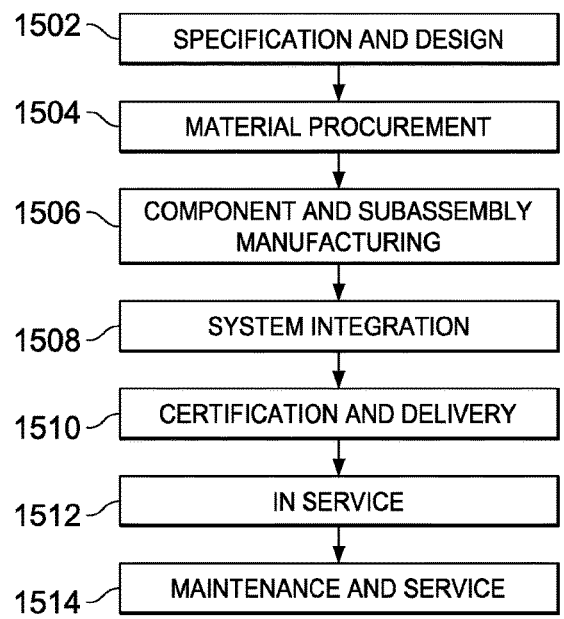
FIG. 15 is an illustration of an aircraft manufacturing and service method in accordance with an illustrative embodiment.
Figure 16:
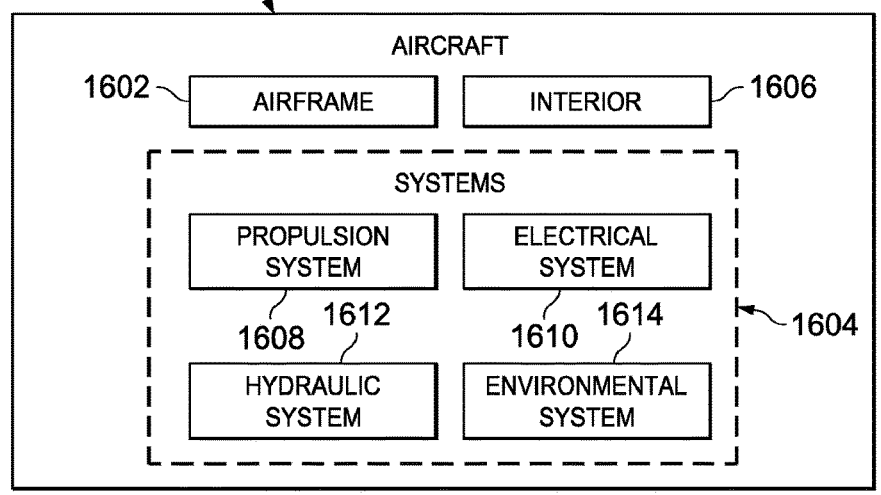
FIG. 16 is an illustration of an aircraft in which an illustrative embodiment may be implemented.

Illustrative embodiments of the disclosure may be described in the context of aircraft manufacturing and service method 1500 as shown in FIG. 15 and aircraft 1600 as shown in FIG. 16. Turning first to FIG. 15, FIG. 15 is an illustration of an aircraft manufacturing and service method in accordance with an illustrative embodiment. During pre-production, aircraft manufacturing and service method 1500 may include specification and design 1502 of aircraft 1600 in FIG. 16 and material procurement 1504.

During production, component and subassembly manufacturing 1506 and system integration 1508 of aircraft 1600 in FIG. 16 takes place. Thereafter, aircraft 1600 in FIG. 16 may go through certification and delivery 1510 in order to be placed in service 1512. While in service 1512 by a customer, aircraft 1600 in FIG. 16 may be scheduled for routine maintenance and service 1514, which may include modification, reconfiguration, refurbishment, and other maintenance or servicing.

Each of the processes of aircraft manufacturing and service method 1500 may be performed or carried out by one or more of a system integrator, a third party, or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 16, FIG. 16 is an illustration of an aircraft in which an illustrative embodiment may be implemented. In this example, aircraft 1600 may be produced by aircraft manufacturing and service method 1500 in FIG. 15 and may include airframe 1602 with plurality of systems 1604 and interior 1606. Examples of systems 1604 include one or more of propulsion system 1608, electrical system 1610, hydraulic system 1612, and environmental system 1614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1500 in FIG. 15.

In one illustrative example, components or subassemblies produced in component and subassembly manufacturing 1506 in FIG. 15 may be fabricated or manufactured in a manner similar to components or subassemblies produced while aircraft 1600 may be in service 1512 in FIG. 15. As yet another example, one or more apparatus embodiments, method embodiments, or a combination thereof may be utilized during production stages, such as component and subassembly manufacturing 1506 and system integration 1508 in FIG. 15. One or more apparatus embodiments, method embodiments, or a combination thereof may be utilized while aircraft 1600 may be one or more of in service 1512 and during maintenance and service 1512 in FIG. 15. The use of a number of the different illustrative embodiments may substantially expedite the assembly of and/or reduce the cost of aircraft 1600.

The flowcharts and block diagrams in the different depicted illustrative embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, blocks may be removed from and other blocks may be added in addition to the illustrated blocks in a flowchart or block diagram.

The description of the different illustrative embodiments has been presented for purposes of illustration and description, and may be not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus of an aircraft, the apparatus comprising:
 a wing comprising:
  an unfixed portion, and
  a fixed portion connected to the unfixed portion;
 the unfixed portion movably connected to the fixed portion, the unfixed portion comprising a rotating portion of the unfixed portion, the rotating portion configured to rotate between a flight position and a folded position, and a first member of the rotating portion configured to:
  support the unfixed portion, connect the unfixed portion to the fixed portion, and slide into a third member of the fixed portion;
 a track extension of the first member configured to fit into a track of the fixed portion, and support and guide the first member in:
  the flight position, the folded position, and transition between the flight position and the folded position; and
 a joint configured to allow rotation of the unfixed portion of the wing with respect to the fixed portion of the wing about a rotation axis, the rotation axis being one or more of: vertical, substantially perpendicular to the wing, and substantially parallel to a yaw axis of the aircraft.

2. The apparatus of claim 1, further comprising:
 a second member of the rotating portion comprising a first hinge member, a fold actuator connection point, and a first joint member;
  the first hinge member configured to allow movement of a drop portion of the unfixed portion with respect to the rotating portion of the unfixed portion; and
  the first joint member configured to allow for rotation of the rotating portion about the rotation axis of the joint and connect to a second joint member of the fixed portion.

3. The apparatus of claim 2, further comprising:
the third member of the fixed portion configured to support the first member in the flight position.

4. The apparatus of claim 3, further comprising:
a fourth member of the fixed portion configured to support the second member in the flight position.

5. The apparatus of claim 3, further comprising:
a fold actuator connection point configured to: connect the rotating portion to a fold actuator, provide a stiffness that allows the rotating portion to move, and form an extension of a second member of the rotating portion.

6. The apparatus of claim 1, further comprising:
a drop portion configured to move to a location that: unblocks the rotating portion, and provides space for the unfixed portion to fold next to the fixed portion.

7. The apparatus of claim 6, further comprising:
a first hinge member of the rotating portion configured to allow movement of the drop portion with respect to the rotating portion.

8. The apparatus of claim 7, further comprising:
a hinge configured to allow movement of the drop portion of the unfixed portion of the wing about a substantially horizontal axis of the unfixed portion of the wing with respect to the unfixed portion of the wing, the hinge comprising:
  the first hinge member configured to connect the rotating portion to the drop portion;
  a second hinge member configured to connect the drop portion to the rotating portion;
  a first surface of the drop portion; and
  a second surface of the drop portion, the second surface configured to connect the drop portion to a link, the second surface being larger than the first surface; and
the link configured to cause rotation of the drop portion with respect to the rotating portion during transition between the folded position and the flight position.

9. The apparatus of claim 7, further comprising:
a second hinge member of the drop portion configured to allow movement of the drop portion with respect to the rotating portion.

10. The apparatus of claim 9, further comprising:
a first connection point of the drop portion configured to connect the drop portion to a first end of a link.

11. The apparatus of claim 10, further comprising:
the first connection point configured to provide at least one of: stiffness, and rigidity, to cause the drop portion to move responsive to movement of the rotating portion.

12. The apparatus of claim 11, further comprising:
a second connection point of the fixed portion, the second connection point connected to a second end of the link and configured to provide at least one of: stiffness, and rigidity, to cause the drop portion to move, responsive to movement of the rotating portion.

13. A system configured to improve a fuel efficiency of an aircraft, such that the system comprises:
a wing that comprises an unfixed portion and a fixed portion, such that the unfixed portion rotates between an expanded wingspan and a reduced wingspan for the aircraft that allows ground operation of the aircraft at an airport that prohibits ground operation of aircraft with the expanded wingspan;
a rotating portion of the unfixed portion configured to rotate between a flight position and a folded position;
a first member of the rotating portion configured to:
  support the unfixed portion, connect the unfixed portion to the fixed portion, and slide into a third member of the fixed portion;
a track extension of the first member configured to fit into a track of the fixed portion, and support and guide the first member in:
  the flight position, the folded position, and transition between the flight position and the folded position;
a joint that comprises a first joint member and a second joint member, the joint configured to allow rotation of the unfixed portion of the wing with respect to the fixed portion of the wing about a rotation axis, the rotation axis being one or more of vertical, substantially perpendicular to the wing, and substantially parallel to a yaw axis of the aircraft; and
a drop portion configured to allow the unfixed portion of a wing of the aircraft to rotate horizontally back toward a tail of the aircraft.

14. The system of claim 13, further configured to be actuated by a single actuator.

15. The system of claim 14, further comprising:
the unfixed portion movably connected to the fixed portion, such that the unfixed portion comprises:
  a second member of the rotating portion, such that the second member comprises a first hinge member, a fold actuator connection point, and the first joint member connected to the second joint member connected to the fixed portion, the first joint member configured to allow for rotation of the rotating portion about the rotation axis of the joint; and
  the first hinge member configured to allow: movement of the drop portion of the unfixed portion with respect to the rotating portion of the unfixed portion;
the third member of the fixed portion configured to support the first member in the flight position;
a fourth member of the fixed portion configured to support the second member in the flight position; and
the fold actuator connection point configured to: connect the rotating portion to a fold actuator, provide a stiffness that allows the rotating portion to move, and form an extension of the second member.

16. The system of claim 15, further comprising;
the unfixed portion further comprising:
  the drop portion configured to move to a location that unblocks the rotating portion and provides space for the unfixed portion to fold next to the fixed portion;
  a second hinge member of the drop portion configured to allow movement of the drop portion with respect to the rotating portion.

17. The system of claim 16, further comprising;
the unfixed portion further comprising:
  a first connection point of the drop portion configured to connect the drop portion to a first end of a link;
  the first connection point configured to provide at least one of: stiffness, and rigidity, to cause the drop portion to move responsive to movement of the rotating portion.

18. The system of claim 17, further comprising;
the unfixed portion further comprising:
  a second connection point of the fixed portion, the second connection point connected to a second end of the link and configured to provide at least one of: stiffness, and rigidity, to cause the drop portion to move responsive to movement of the rotating portion; and the link configured to cause rotation of the drop portion with respect to the rotating portion during transition between the folded position and the flight position.

* * * * *

UNITED STATES PATENT AND TRADEMARK OFFICE
CERTIFICATE OF CORRECTION

PATENT NO. : 9,950,780 B2
APPLICATION NO. : 14/961895
DATED : April 24, 2018
INVENTOR(S) : Santini et al.

Page 1 of 1

It is certified that error appears in the above-identified patent and that said Letters Patent is hereby corrected as shown below:

In the Claims

Column 19, Line 2, change "the third member" to --a third member--
Column 19, Line 8, change "a fold actuator connection point" to --the fold actuator connection point--
Column 19, Line 11, change "a second member" to --the second member--
Column 20, Line 17, change "a wing of the aircraft" to --the wing of the aircraft--

Signed and Sealed this
Sixteenth Day of October, 2018

Andrei Iancu
*Director of the United States Patent and Trademark Office*